(12) United States Patent
Badcock et al.

(10) Patent No.: US 12,196,631 B2
(45) Date of Patent: Jan. 14, 2025

(54) OPTICAL FIBRE SENSING SYSTEM AND METHOD

(71) Applicant: VICTORIA LINK LIMITED, Wellington (NZ)

(72) Inventors: Rodney Alan Badcock, Lower Hutt (NZ); Maximillian Fisser, Tegernsee (DE)

(73) Assignee: VICTORIA LINK LIMITED, Wellington (NZ)

(*) Notice: Subject to any disclaimer, the term of this patent is extended or adjusted under 35 U.S.C. 154(b) by 839 days.

(21) Appl. No.: 17/255,472

(22) PCT Filed: Jun. 21, 2019

(86) PCT No.: PCT/NZ2019/050075
§ 371 (c)(1),
(2) Date: Dec. 23, 2020

(87) PCT Pub. No.: WO2020/005077
PCT Pub. Date: Jan. 2, 2020

(65) Prior Publication Data
US 2021/0215555 A1    Jul. 15, 2021

(30) Foreign Application Priority Data

Jun. 27, 2018    (AU) ................................ 2018902308

(51) Int. Cl.
*G01L 1/24*    (2006.01)
*G01B 11/16*   (2006.01)
(Continued)

(52) U.S. Cl.
CPC .............. *G01L 1/246* (2013.01); *G01B 11/18* (2013.01); *G01K 1/16* (2013.01); *G01K 11/3206* (2013.01); *H01F 6/02* (2013.01)

(58) Field of Classification Search
CPC .......... G01L 1/246; G01B 11/18; G01K 1/16; G01K 11/3206; H01F 6/02
See application file for complete search history.

(56) References Cited

U.S. PATENT DOCUMENTS 5,361,130 A      11/1994  Kersey et al.
5,848,204 A  *  12/1998  Wanser .............. G02B 6/02085
                                                          385/12
(Continued)

FOREIGN PATENT DOCUMENTS

CN     1183548 A    6/1998
CN     2618176 Y    5/2004
(Continued)

OTHER PUBLICATIONS (https://lunainc.com/sites/default/files/assets/files/resource-library/LUNA-Data-Sheet-OBR-4600-V2.pdf) (Year: 2019).*
(Continued)

*Primary Examiner* — Tarifur R Chowdhury
*Assistant Examiner* — Carlos Perez-Guzman
(74) *Attorney, Agent, or Firm* — POLSINELLI PC

(57) ABSTRACT

An optical fibre sensing system (300) with an incident light source (309), a wavelength spectrum interrogator (313), and an optical fibre (302) with a substantially continuous fibre Bragg grating (306). An upstream portion (318) of the optical fibre has an attenuation length to light to the interrogator (313) at a first equilibrium wavelength. A downstream portion (322) of the optical fibre reflects light to the interrogator (313) when a change in temperature and/or strain at the downstream portion (322) causes a portion of the fibre Bragg grating to reflect light to the interrogator (313) at a second wavelength and at a second intensity. A processor (315) is configured to analyse the reflected spectrum (314) to determine when a portion of the fibre Bragg grating (306) is experiencing a change in temperature and/or
(Continued)

strain based on deviation in the reflected spectrum (314) from an initial peak corresponding to the initial wavelength.

20 Claims, 16 Drawing Sheets

(51) Int. Cl.
  *G01K 1/16* (2006.01)
  *G01K 11/3206* (2021.01)
  *H01F 6/02* (2006.01)

(56) References Cited

U.S. PATENT DOCUMENTS

| | | | |
|---|---|---|---|
| 5,903,375 A | 5/1999 | Horiuchi et al. | |
| 6,137,565 A | 10/2000 | Ecke et al. | |
| 9,442,004 B2 | 9/2016 | Glavind et al. | |
| 2004/0067003 A1 | 4/2004 | Chliaguine et al. | |
| 2005/0094151 A1* | 5/2005 | Pang | G01L 1/246 |
| | | | 356/478 |
| 2007/0156212 A1* | 7/2007 | Saxena | A61B 18/18 |
| | | | 600/549 |
| 2008/0285916 A1* | 11/2008 | Sappey | G01J 5/0803 |
| | | | 385/27 |
| 2009/0067785 A1 | 3/2009 | Ghidini et al. | |
| 2011/0170823 A1 | 7/2011 | Xia et al. | |
| 2015/0023389 A1* | 1/2015 | Imaoka | H01M 6/5044 |
| | | | 374/161 |
| 2015/0029511 A1* | 1/2015 | 'T Hooft | G01B 9/02004 |
| | | | 356/477 |
| 2015/0177132 A1* | 6/2015 | Pechstedt | G01N 33/22 |
| | | | 356/517 |
| 2017/0138802 A1* | 5/2017 | Fisk | G01K 13/00 |
| 2017/0238821 A1* | 8/2017 | Hayes | G02B 6/3846 |
| 2018/0196191 A1* | 7/2018 | Wang | G02B 6/02076 |
| 2019/0101419 A1* | 4/2019 | Rowen | G01K 11/324 |
| 2020/0158584 A1* | 5/2020 | Morgan | G02B 6/12 |

FOREIGN PATENT DOCUMENTS

| | | |
|---|---|---|
| CN | 1632485 A | 6/2005 |
| CN | 1761857 A | 4/2006 |
| CN | 1853085 A | 10/2006 |
| CN | 102227615 A | 10/2011 |
| CN | 102931573 A | 2/2013 |
| CN | 104755892 A | 7/2015 |
| CN | 106461495 A | 2/2017 |
| WO | 2005/040727 A2 | 5/2005 |
| WO | 2007079266 A2 | 7/2007 |
| WO | 2013/093788 A1 | 6/2013 |
| WO | 2017203271 A1 | 11/2017 |

OTHER PUBLICATIONS

International Search Report and Written Opinion issued on Sep. 6, 2019 for corresponding PCT Application No. PCT/NZ2019/050075.
Paul S. Westbrook et al., "Continuous Multicore Optical Fiber Grating Arrays for Distributed Sensing Applications," Journal of Lightwave Technology, vol. 35, No. 6, 2017, pp. 1248-1252.
International-Type Search Report issued on Aug. 3, 2018 for corresponding Australian Application No. 2018902308.
Chinese Office Action issued on Dec. 28, 2023 for corresponding Chinese Application No. 201980033106.2.

* cited by examiner

OPTICAL FIBRE SENSING SYSTEM AND METHOD

CROSS-REFERENCE TO RELATED APPLICATIONS

This application is a national stage application (under 35 U.S.C. § 371) of PCT/NZ2019/050075, filed Jun. 21, 2019, which claims benefit of Australian Application No. 2018902308, filed Jun. 27, 2018, which are incorporated herein by reference in their entireties.

FIELD OF THE INVENTION

This invention relates to an optical fibre sensing system and a method of sensing a change in temperature and/or strain.

BACKGROUND

Field windings in High Temperature Superconducting (HTS) machines consist of significant lengths of high temperature superconducting material (eg. ReBCO) tape or wire) with inductance in the range of 1-10 H for a megawatt class machine. The detection of quench in these coils is a significant challenge using conventional voltage detection methodology. Detection methodology must operate in an electrically noisy environment (large AC magnetic and electric fields), have high localized sensitivity to temperature changes, operate reliably at cryogenic temperatures, and be cost economical.

Fibre Bragg grating (FBG) temperature sensors are good candidates for quench detection in HTS due to their low EMI sensitivity, light weight and small heat invasion. However, known FBG techniques suffer from drawbacks that render them unsuitable for many commercial applications.

FIG. 1A shows a schematic of a Fibre Bragg Grating (FBG) sensor 100. The FBG sensor comprises an optical fibre 102 having cladding 103 and a core 104. A grating 106 is written into the core 104 of the optical fibre 102. The grating 106 has a spacing $\wedge$ that modulates the refractive index 108 of the core 104. The grating 106 reflects light of a certain wavelength, and transmits other wavelengths. An incident light source 109 provides a spectrum of incident light 110 to an upstream end 112a of the sensor 100. Some of the incident light 110 is transmitted to a downstream end 112b of the fibre 102 to provide a transmitted spectrum 111. Some of the incident light 110 is reflected by the grating 106 to provide a reflected spectrum 114. An interrogator 113 detects the reflected spectrum 114. The spectrum 114 of the back reflected light has a characteristic shape: a peak 116 with a centre wavelength, which is known as the Bragg wavelength $\lambda_B$. The reflected spectrum 114 is analysed by a processor 115.

FBG sensors are sensitive to temperature and strain. FIG. 1B shows the sensor 100 of FIG. 1A subject to a change in temperature and/or strain. Changes to temperature and strain change the spacing $\wedge$ of the grating 106, either due to thermal expansion or elastic elongation. This change in spacing changes the effective refractive index of the grating 106, causing the peak in the reflected spectrum 114 to shift. Temperature and strain changes can be measured by tracking the Bragg wavelength $\lambda_B$. An increase in temperature or strain generally causes the Bragg wavelength $\lambda_B$ to increase.

FBG sensors are typically point sensors with high reflectivity and a sensing length of about 10 mm. FIG. 2 illustrates a technique where several point sensing FBG sensors $100_I$, $100_{II}$ . . . $100_n$ are connected in series to form a quasi-distributed sensor 100a. To differentiate between the points, each FBG sensor $100_I$, $100_{II}$ . . . $100_n$ has a grating $106_I$, $106_{II}$ . . . $106_n$ with a different centre wavelength $\lambda_I$, $\lambda_{II}$ . . . $\lambda_n$. The gratings $106_I$, $106_{II}$ . . . $106_n$ are interrogated using wavelength division multiplexing (WDM). This interrogation technique is very fast. However, the number of sensors $100_I$, $100_{II}$ . . . $100_n$ per fibre 102 is limited by the need to have sufficient separation between the centre wavelengths $\lambda_I$, $\lambda_{II}$ . . . $\lambda_n$ (about 3 nm). Depending on the resolution of the interrogation equipment, around 20-30 sensors $100_I$, $100_{II}$ . . . $100_n$ would typically be used. This limits the area/length that can be monitored simultaneously.

FIG. 3 illustrates another FBG technique. A continuous FBG sensor 200 is formed from a series of gratings $206_I$, $206_{II}$, $206_{III}$ . . . $206_n$ (forming a total length of 100 mm up to 50 m) having the same Bragg wavelength $\lambda_B$ and low reflectivity. A Time Division Multiplexing (TDM) method such as Optical Time Domain Reflectometry (OTDR) interrogator 213 is used to measure the timing between incident light 210 provided by the incident light source 209, and reflected signal 214, enabling discrete intervals of the fibre 202 to be interrogated. The reflected signal 214 is analysed by a processor 215. The reflectivity of gratings $206_I$, $206_{II}$, $206_{III}$ . . . $206_n$ must be very low to enable incident light 210 at the Bragg wavelength $\lambda_B$ to travel the entire length of the fibre 202. Fibre reflectivities are typically <0.1% for a grating length of 8 mm. This technique allows interrogation over a long distance, but is relatively slow, has relatively low resolution and requires extremely expensive interrogation equipment.

WO 2013/093788 discloses this type of system.

US 2004/0067003 discloses a system that requires discretised individual sensing regions. A system such as that shown in D2 requires there to be no overlap between first and second wavelength ranges to detect a change. That means that there needs to be a significant change in the length of one of the sensing regions for the system to detect the change.

In this specification where reference has been made to patent specifications, other external documents, or other sources of information, this is generally for the purpose of providing a context for discussing the features of the invention. Unless specifically stated otherwise, reference to such external documents or such sources of information is not to be construed as an admission that such documents or such sources of information, in any jurisdiction, are prior art or form part of the common general knowledge in the art.

It is an object of at least preferred embodiments of the present invention to provide a FBG sensing system and method that overcomes at least some of the problems of known FBG techniques, and/or to at least provide the public with a useful alternative.

SUMMARY OF THE INVENTION

In accordance with a first aspect of the invention, there is provided an optical fibre sensing system comprising: an optical fibre comprising a substantially continuous fibre Bragg grating, the fibre Bragg grating having a grating spacing that is substantially the same along the length of the optical fibre when the optical fibre is in an equilibrium temperature and strain condition; an incident light source for providing incident light to an upstream end of the optical fibre; and a wavelength spectrum interrogator for detecting a reflected spectrum of the incident light from the optical fibre; wherein an upstream portion of the optical fibre has an attenuation length that is adapted to reflect incident light to the interrogator at a first equilibrium wavelength, and a downstream portion of the optical fibre is adapted to reflect light to the interrogator when a change in temperature and/or strain at the downstream portion causes a portion of the fibre Bragg grating to reflect light to the interrogator at a second wavelength other than the equilibrium wavelength and at a second intensity, wherein in the equilibrium temperature and strain condition, the downstream portion is adapted to reflect no light at the second wavelength, or is adapted to reflect a first intensity of light at the second wavelength that is lower than the second intensity; the optical fibre sensing system further comprising a processor configured to analyse the detected reflected spectrum to determine when a portion of the fibre Bragg grating is experiencing a change in temperature and/or strain based on deviation in the detected reflected spectrum from an initial peak corresponding to the equilibrium wavelength.

In an embodiment, the optical fibre is at least 100 mm long.

In an embodiment, the fibre Bragg grating extends along substantially the entire length of the optical fibre.

In an embodiment, the optical fibre comprises a plurality of short fibre Bragg gratings in series to form a substantially continuous fibre Bragg grating. In an embodiment, the short fibre Bragg gratings are about 9 mm long. In an embodiment, the short fibre Bragg gratings are spaced apart by about 1 mm.

In an embodiment, the optical fibre comprises a single, continuous fibre Bragg rating.

In an embodiment, the optical fibre is longer than the attenuation length of the fibre Bragg grating. In an embodiment, the optical fibre is at least twice the attenuation length of the fibre Bragg grating. In an embodiment, the optical fibre is at least 6 times the attenuation length of the fibre Bragg grating.

In an embodiment, the overall reflectivity of the fibre Bragg grating is greater than 20%.

In an embodiment, the overall reflectivity of the fibre Bragg grating is greater than 50%.

In an embodiment, the overall reflectivity of the fibre Bragg grating is greater than 95%.

In an embodiment, the overall reflectivity of the fibre Bragg grating is greater than 99%.

In an embodiment, the processor is configured to analyse the reflected spectrum to determine when a portion of the fibre Bragg grating is experiencing a change in temperature and/or strain by detecting a change in an envelope of the reflected spectrum with non-separated peaks.

In an embodiment, the processor is configured to determine when a portion of the fibre Bragg grating is experiencing a change in temperature and/or strain based on a change in dimension of the reflected spectrum.

In an embodiment, the processor is configured to determine when a portion of the fibre Bragg grating is experiencing a change in temperature and/or strain based on a width-at-threshold algorithm.

In an embodiment, the processor is configured to determine when a portion of the fibre Bragg grating is experiencing a change in temperature and/or strain based on a power integral algorithm.

In an embodiment, the processor is configured to determine when a portion of the fibre Bragg grating is experiencing a change in temperature and/or strain based on a change algorithm.

In an embodiment, the processor is configured to determine when a portion of the fibre Bragg grating is experiencing a change in temperature and/or strain based on applying a weight to the spectrum prior to using the algorithm.

In an embodiment, the fibre Bragg grating is adapted to reflect light to the interrogator at the second wavelength when a change in temperature and/or strain occurs in the upstream portion of the optical fibre.

In an embodiment, the optical fibre sensing system is capable of determining when a portion of the fibre Bragg grating is experiencing a change in temperature as small as 5 Kelvin (5° C.).

In an embodiment, the optical fibre sensing system is capable of determining when a portion of the fibre Bragg grating is experiencing a change in temperature as small as 1 Kelvin (1° C.).

In accordance with a second aspect of the invention, there is provided a method of sensing a change in temperature and/or strain, comprising: providing an optical fibre comprising a substantially continuous fibre Bragg grating, the fibre Bragg grating having a grating spacing that is substantially the same along the length of the optical fibre when the optical fibre is in an equilibrium temperature and strain condition; providing incident light to an end of the optical fibre; detecting a reflected spectrum of the incident light from the optical fibre with a wavelength spectrum interrogator; wherein an upstream portion of the optical fibre has an attenuation length that is adapted to reflect incident light to the interrogator at a first equilibrium wavelength, and a downstream portion of the optical fibre is adapted to reflect light to the interrogator when a change in temperature and/or strain at the downstream portion causes a portion of the fibre Bragg grating to reflect light to the interrogator at a second wavelength other than the equilibrium wavelength and at a second intensity, wherein in the equilibrium temperature and strain condition, the downstream portion is adapted to reflect no light at the second wavelength, or is adapted to reflect a first intensity of light at the second wavelength that is lower than the second intensity; wherein the method further comprises analysing the detected reflected spectrum using a processor to determine when a portion of the fibre Bragg grating is experiencing a change in temperature and/or strain based on deviation in the detected reflected spectrum from an initial peak corresponding to the equilibrium wavelength.

In an embodiment, the method is used to detect emergence of a hot-spot.

In an embodiment, the method is used to detect quench in a high-temperature superconducting field winding.

In an embodiment, the fibre Bragg grating is subject to background inhomogeneous thermal strain which causes peak splitting in the detected reflected spectrum.

The method may be performed using the optical fibre sensing system outlined in relation to the first aspect above.

The term 'comprising' as used in this specification and claims means 'consisting at least in part of'. When interpreting statements in this specification and claims which include the term 'comprising', other features besides the features prefaced by this term in each statement can also be present. Related terms such as 'comprise' and 'comprised' are to be interpreted in a similar manner.

The terms 'component', 'module', 'system', 'interface', and/or the like as used in this specification in relation to a processor are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

This invention may also be said broadly to consist in the parts, elements and features referred to or indicated in the specification of the application, individually or collectively, and any or all combinations of any two or more said parts, elements or features.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting. Where specific integers are mentioned herein which have known equivalents in the art to which this invention relates, such known equivalents are deemed to be incorporated herein as if individually set forth.

As used herein the term '(s)' following a noun means the plural and/or singular form of that noun.

As used herein the term 'and/or' means 'and' or 'or', or where the context allows both.

The invention consists in the foregoing and also envisages constructions of which the following gives examples only.

BRIEF DESCRIPTION OF THE DRAWINGS

The present invention will now be described by way of example only and with reference to the accompanying drawings in which.

DETAILED DESCRIPTION OF PREFERRED EMBODIMENTS

Figure 4A:
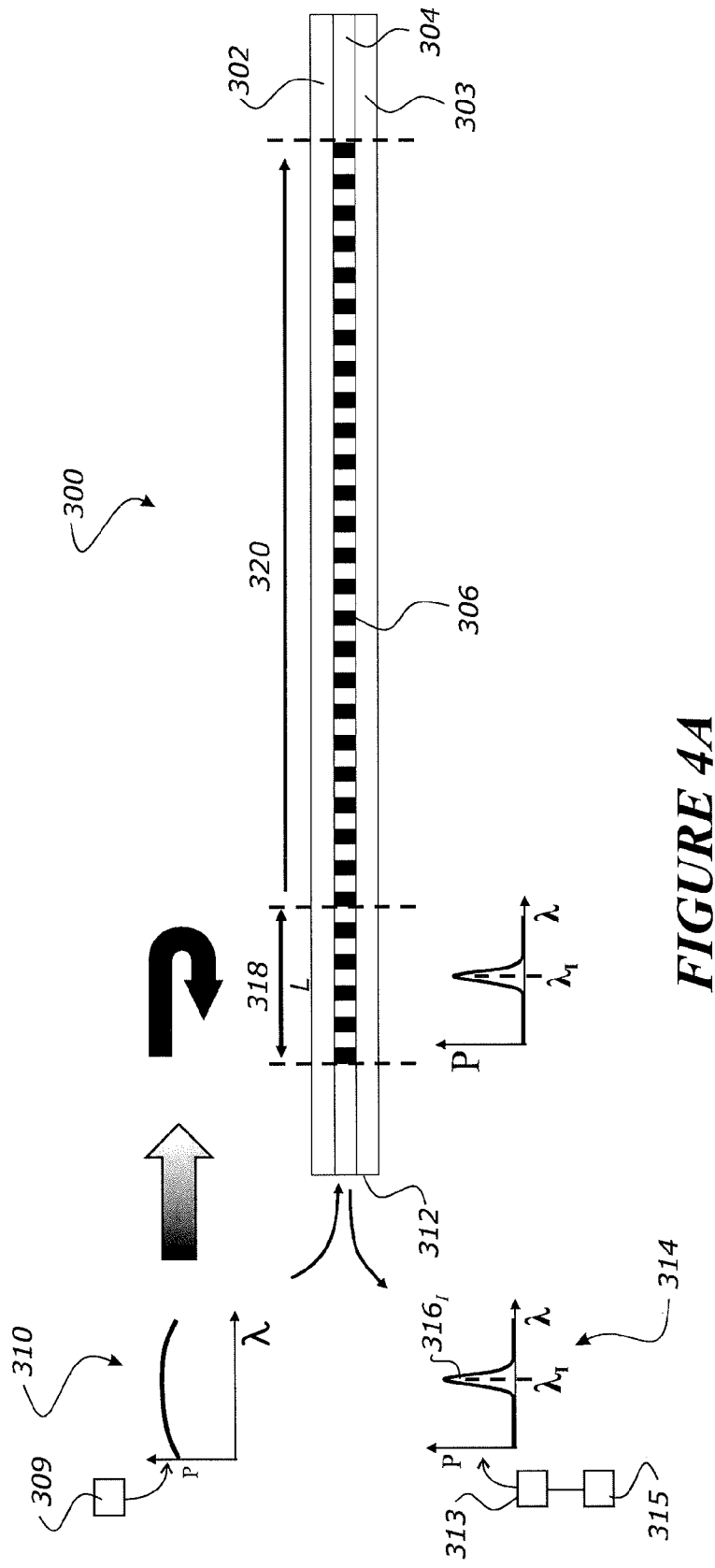
FIG. 4A shows a schematic of a first embodiment optical fibre sensing system comprising a continuous FBG.

Referring to FIG. 4A, an optical fibre sensing system 300 comprises an optical fibre 302 comprising a substantially continuous fibre Bragg grating (FBG) 306, an incident light source 309 for providing incident light 310 to an upstream end 312 of the optical fibre 302, a wavelength spectrum interrogator 313 for detecting a reflected spectrum 314 of the incident light 310 from the optical fibre 302, and a processor 315 configured to analyse the detected reflected spectrum 314 to determine whether or when a portion of the fibre Bragg grating 306 is experiencing a change in temperature and/or strain.

In an embodiment, the wavelength spectrum interrogator 313 is a wavelength division multiplexing (WDM) interrogator. In alternative embodiments, the wavelength spectrum interrogator 313 may be any suitable interrogator, such as an optical spectrum analyser or a spectrometer.

The processor 315 may be a central processing unit (CPU), a graphics processing unit (GPU), a digital signal processor (DSP), an application specific integrated circuit (ASIC), a radio-frequency integrated circuit (RFIC), or any suitable combination thereof.

The optical fibre 302 has cladding 303 and a core 304. The fibre Bragg grating 306 is written into the core 304 of the optical fibre 302.

The fibre Bragg grating 306 has a grating spacing that is substantially the same along the length of the optical fibre 302 when the optical fibre 302 is in an equilibrium temperature and strain condition. An upstream portion 318 of the optical fibre 302 has an attenuation length L that is adapted to reflect incident light 310 to the interrogator 313 at a first equilibrium wavelength $\lambda_I$. A downstream portion 320 of the optical fibre 302 is adapted to reflect light to the interrogator 313 when a change in temperature and/or strain at the downstream portion 320 causes a portion of the fibre Bragg grating 306 to reflect light to the interrogator at a second wavelength $\lambda_{II}$ other than the equilibrium wavelength $\lambda_I$ and at a second intensity. In the equilibrium temperature and strain condition, the downstream portion 320 is adapted to reflect no light at the second wavelength $\lambda_{II}$, or is adapted to reflect a first intensity of light at the second wavelength $\lambda_{II}$ that is lower than the second intensity.

The processor 315 is configured to analyse the reflected spectrum that is detected by the interrogator 313 to determine whether or when a portion of the fibre Bragg rating 306 is experiencing a change in temperature and/or strain based on deviation in the detected reflected spectrum from an initial peak corresponding to the equilibrium wavelength $\lambda_I$.

The fibre Bragg grating 306 extends along substantially the entire length of the optical fibre 302.

The term 'continuous fibre Bragg grating' as used herein includes substantially continuous/quasi-continuous fibre Bragg gratings. In an embodiment, the optical fibre comprises a plurality of short fibre Bragg gratings in series to form a substantially continuous fibre Bragg grating. The spacing between the short fibre Bragg gratings is less than the length of the gratings. In an embodiment, the short fibre Bragg gratings are about 9 mm long and the short fibre Bragg gratings are spaced apart by about 1 mm. A series of short fibre Bragg gratings is currently the most feasible manufacturing method for a substantially continuous FBG. In an alternative embodiment the fibre Bragg gratings may be any suitable length, for example about 20 mm long or about 30 mm long. The fibre Bragg gratings may be spaced apart by any suitable spacing, for example, 2, 3, 4, or 5 mm apart.

In an embodiment the optical fibre 302 comprises a single, continuous fibre Bragg grating.

The optical fibre sensing system 300 is able to quickly detect a change in temperature and/or strain anywhere along the length of the optical fibre 302. In particular, the processor 315 can detect an initial change in the reflected spectrum to quickly determine when a portion of the fibre Bragg grating 306 is experiencing a change in temperature and/or strain.

The upstream portion 318 of the optical fibre 302 effectively 'shadows' the downstream portion 320 of the fibre 302 from incident light at the equilibrium wavelength $\lambda_I$. When the optical fibre 302 is in an equilibrium condition (uniform temperature and strain), the downstream portion 320 of the optical fibre 302 reflects substantially no light and the reflected spectrum 314 that is detected by the interrogator 313 and analysed by the processor 315 has a single peak $316_I$.

Figure 4B:
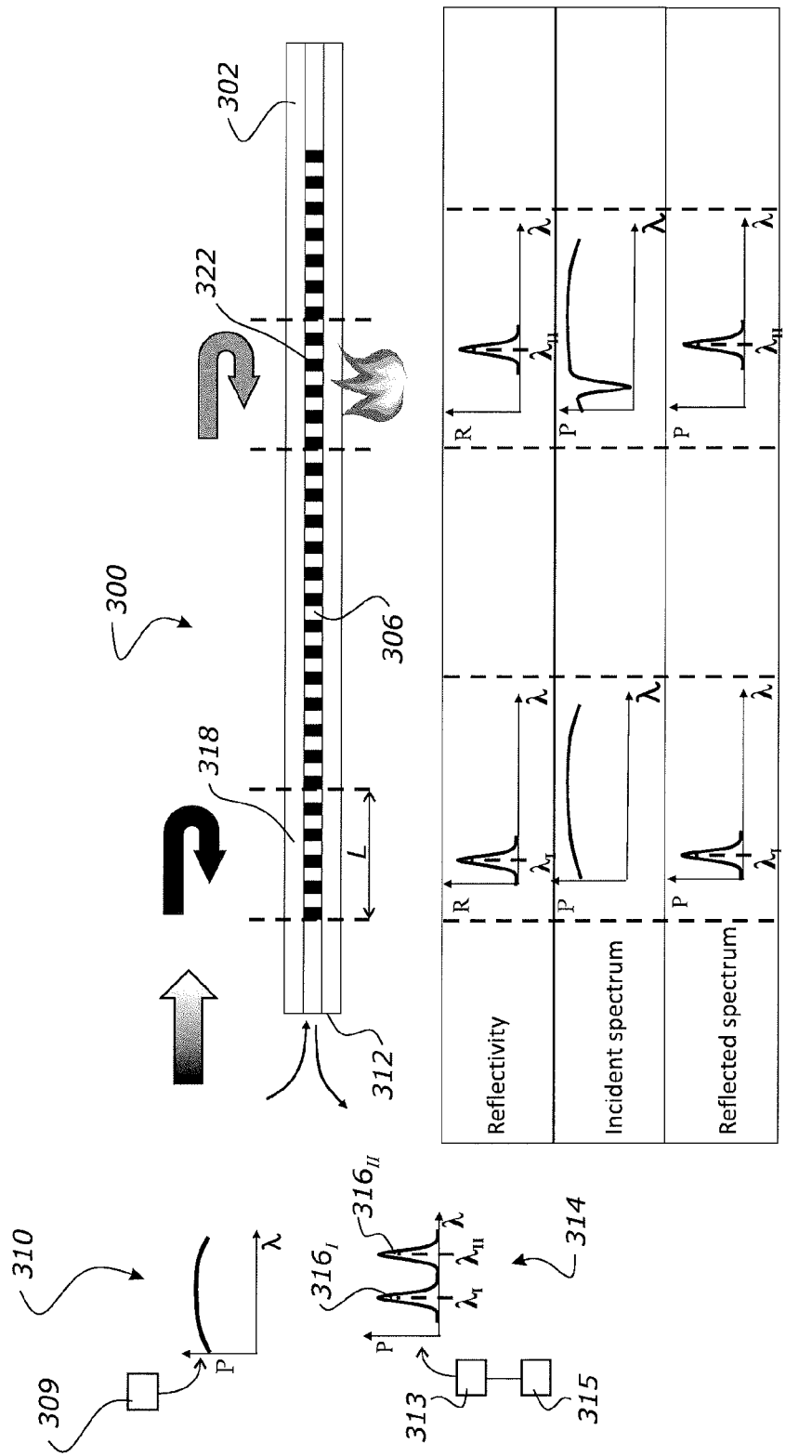
FIG. 4B shows a schematic of the sensor of FIG. 4A when a section of the FBG is subject to a change in temperature and/or strain, once a hotspot has formed.

Referring to FIG. 4B, when a section 322 of the FBG 306 is subject to a change in temperature and/or strain, the refractive index of the section 322 changes. Light is reflected by the section 322 at a second wavelength $\lambda_{II}$ that is different to the equilibrium wavelength $\lambda_I$ and an additional peak $316_{II}$ appears in the reflected spectrum 314 that is detected by the interrogator 313 and analysed by the processor 315.

As shown and described with reference to FIGS. 5A-D and 6, the peaks $\lambda_I$ and $\lambda_{II}$ will separate over time as the temperature increases (e.g. as a hot spot forms). Unlike the system of US 2004/0067003 for example, it is not necessary for the reflected spectrum to have fully separated discrete wavelength peaks for the optical fibre sensing system 300 to detect the temperature and/or strain change in the fibre 302. Instead, with the present system the wavelength peaks $316_I$ and $316_{II}$ can partly overlap. The processor 315 is able to analyse the reflected spectrum to determine when a portion of the fibre Bragg grating 306 is experiencing a change in temperature and/or strain by detecting a change in an envelope of the reflected spectrum with non-separated peaks.

The section 322 may be anywhere along the length of the FBG 306, including within the attenuation length L. The fibre Bragg grating 306 is adapted to reflect light to the interrogator at the second wavelength $\lambda_{II}$ when a change in temperature and/or strain occurs in the upstream portion 318 (having attenuation length L) of the optical fibre 302. When the section 322 is within the upstream portion 318, light is reflected at the second wavelength $\lambda_{II}$ that is different to the equilibrium wavelength $\lambda_I$. Because the downstream portion 320 of the optical fibre 302 has the same grating spacing as the upstream portion 318, light will continue to be reflected at the equilibrium wavelength $\lambda_I$ when the section 322 is within the upstream portion 318. The reflected spectrum 314 will be substantially the same for a section 322 within the upstream portion 318 as for a section 322 within the downstream portion 320.

Adhesive

It is preferable for the optical fibre 302 to be in intimate thermal and/or mechanical contact with the object that it is measuring (for example, HTS tape/wire). The optical fibre 302 may be adhered to the object using any suitable adhesive. The adhesive may be a removable adhesive, such as vacuum grease, GE vanish, or kapton tape. The adhesive may be a permanent adhesive, such as epoxy. In an embodiment, the adhesive is specifically designed for cryogenic temperatures.

Comparison with Known Continuous FBGs

Figure 1A:
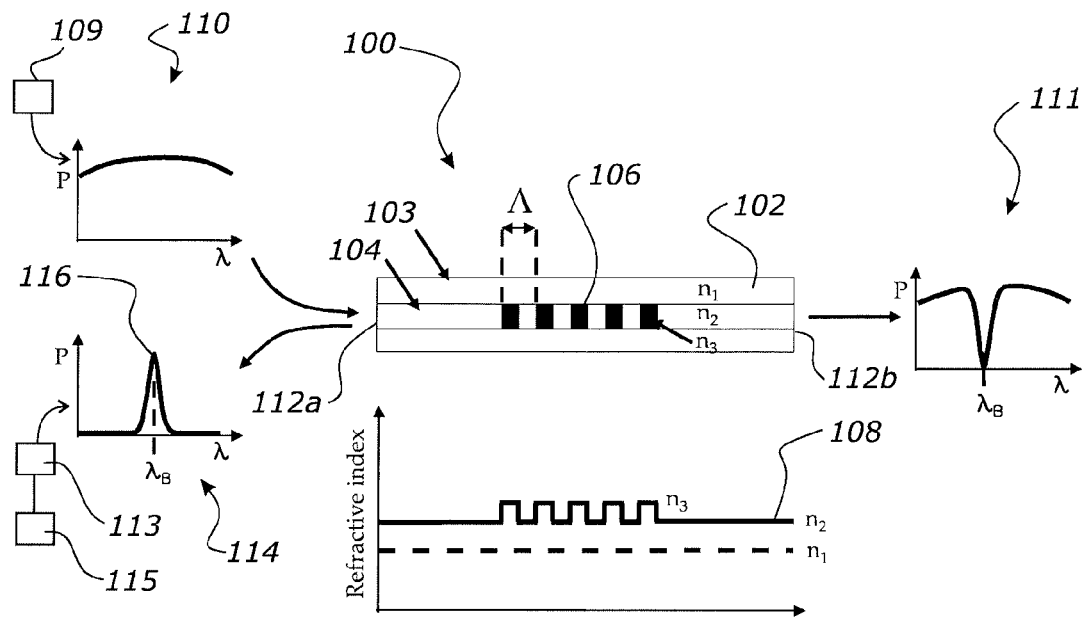
FIG. 1A shows a schematic of a known Fibre Bragg Grating (FBG) sensor.
Figure 1B:
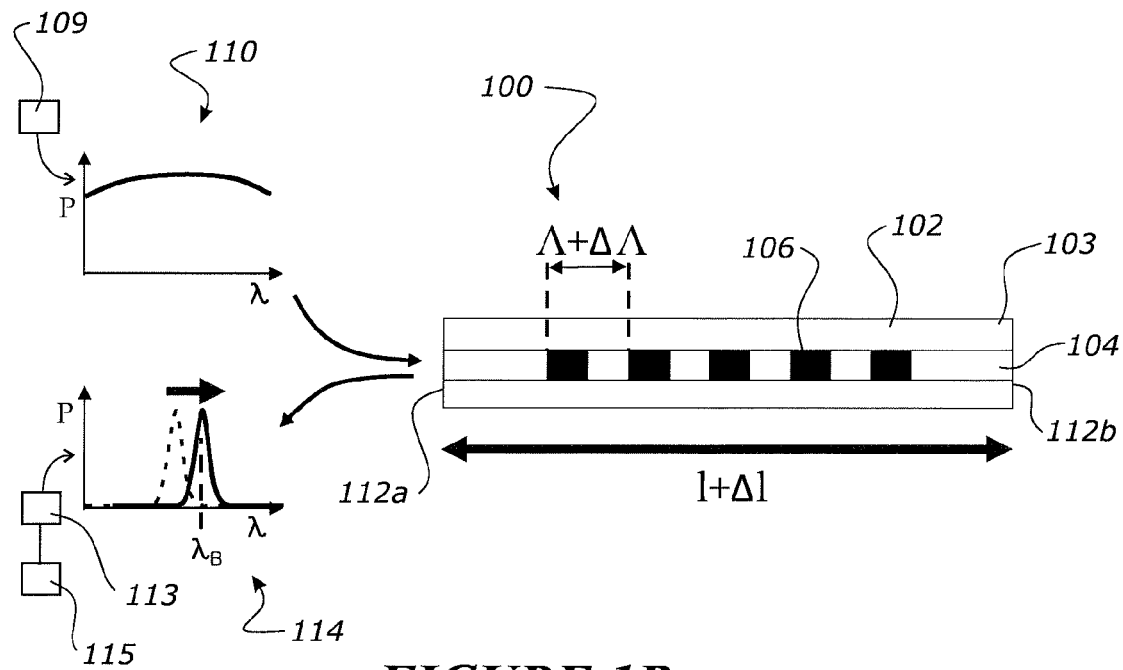
FIG. 1B shows a schematic of the sensor of FIG. 1A subject to a change in temperature and/or strain.
Figure 2:
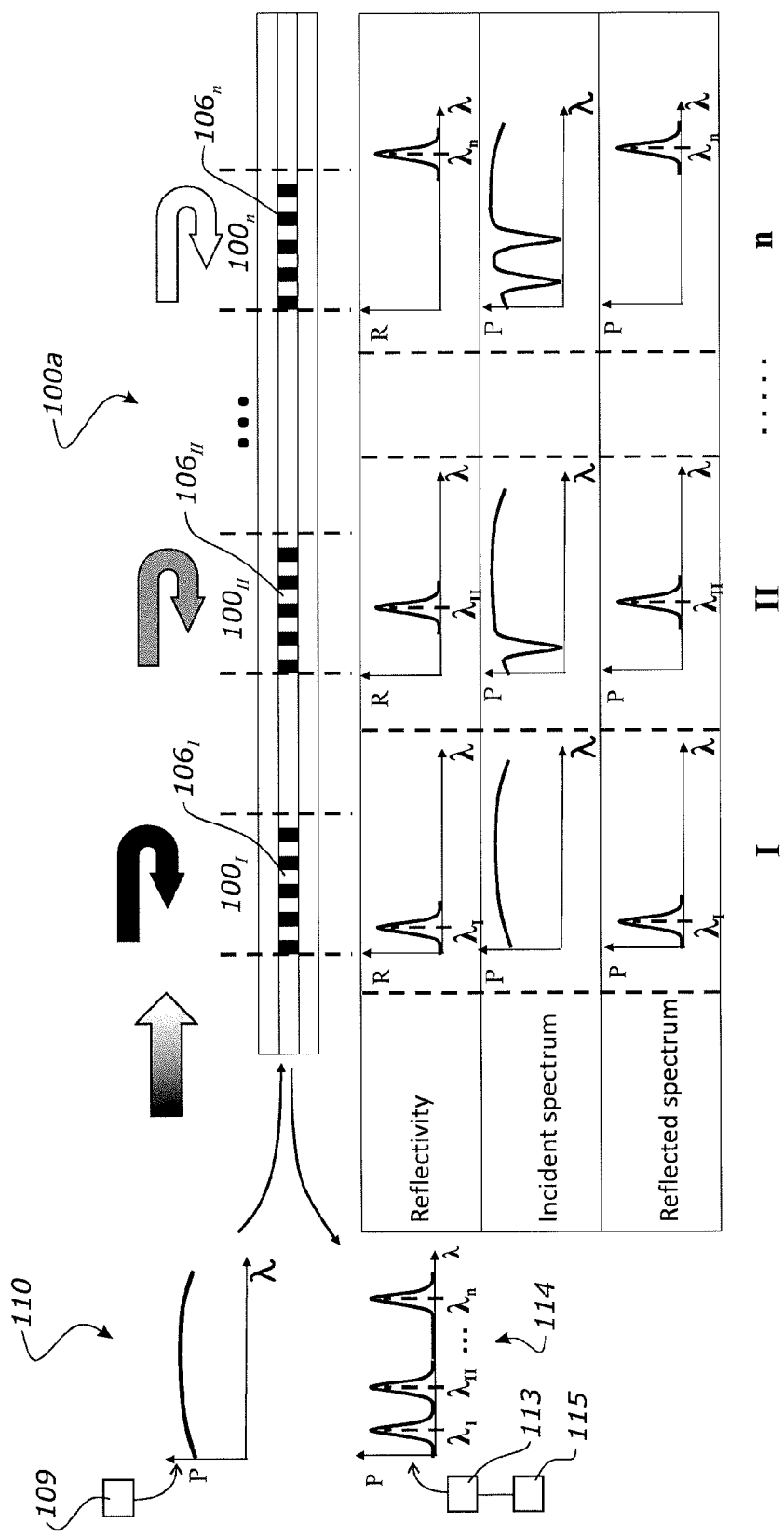
FIG. 2 shows a schematic of a known technique where several point sensing FBG sensors are connected in series to form a quasi-distributed sensor.
Figure 3:
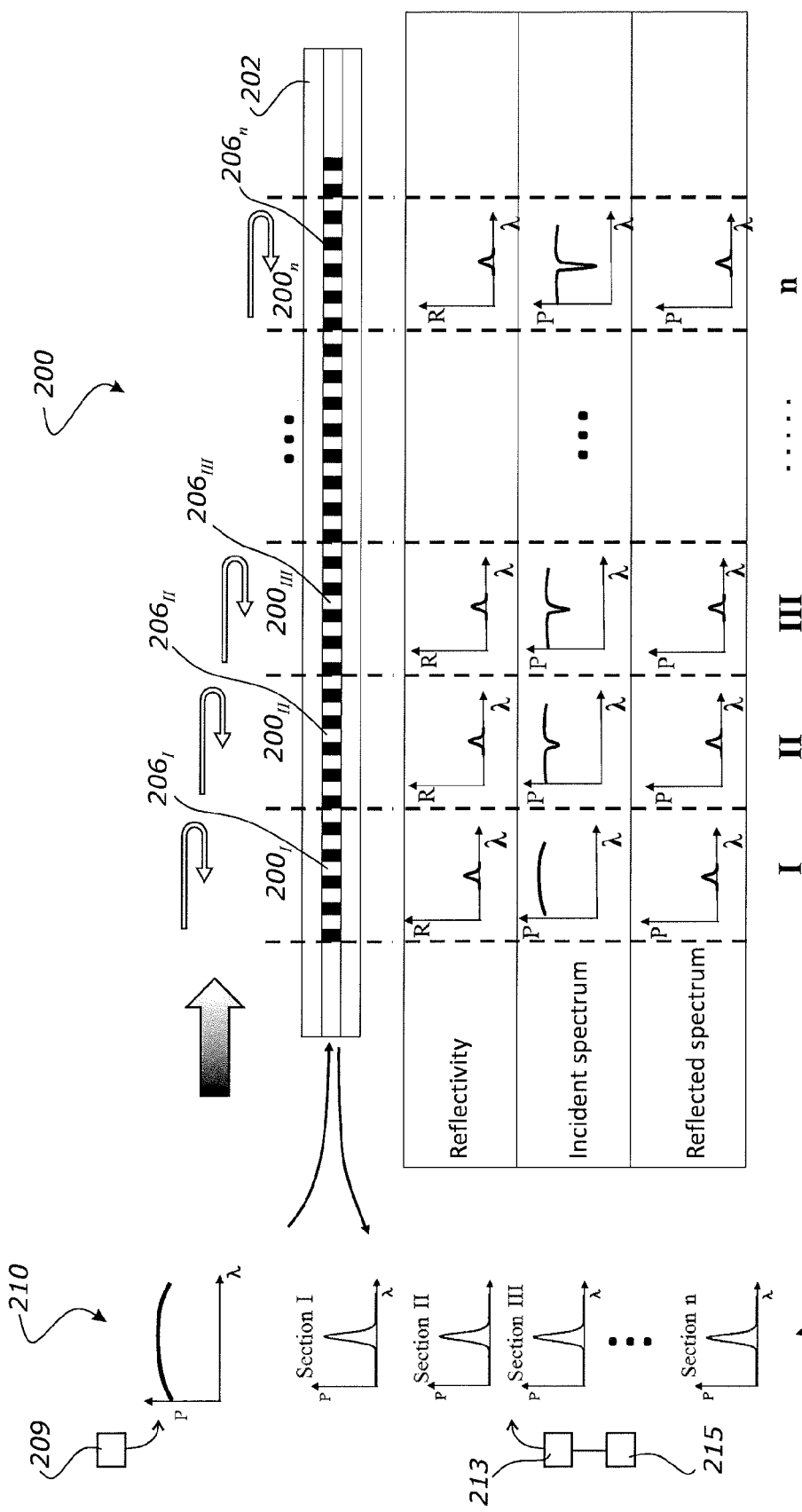
FIG. 3 shows a schematic of a known continuous FBG sensor.

Unlike known continuous FBG sensors 200 that utilise TDM interrogation techniques (see FIG. 3), the optical fibre sensing system 300 does not require a high proportion of incident light at the equilibrium wavelength $\lambda_I$ to travel the entire length of the optical fibre 302. This enables the optical fibre sensing system 300 to use an FBG 306 with significantly higher reflectivity than the FBGs 206 used in known continuous FBG sensors 200. Higher reflectivity FBGs provide a higher resolution signal and require less sensitive interrogators than low reflectivity FBGs.

The optical fibre sensing system 300 enables temperature and/or strain changes to be quickly detected over a long distance, using a wavelength spectrum interrogator that has a simple fixed dispersion element (grating) and a relatively simple intensity detector, such as a charge-coupled device (CCD) or linear detector. In an embodiment, the optical fibre is at least 100 mm long. In an embodiment, the optical fibre is at least 1 m long. In an embodiment, the optical fibre is at least 100 m long. The optical fibre may be up to several hundred metres or several kilometres long.

The optical fibre sensing system 300 does not determine the location of a temperature and/or strain change, only that a change has occurred. This makes the optical fibre sensing system 300 suitable for applications where quick identification of temperature and/or strain changes is required, but where the location of the changes is not important. For example, for quench detection in an HTS coil it is more important to identify that a hot-spot may be occurring rather than a precise location of the hot spot.

Attenuation Length

In an embodiment, the upstream portion 318 is defined by the attenuation length L of the fibre Bragg grating 306. The attenuation length L is the distance from the upstream end 312 of the optical fibre 302 at which 1/e (about 63%) of the incident light 310 at the equilibrium wavelength $\lambda_I$ is reflected. At a distance of 2L from the upstream end 312, about 86% of the incident light 310 at the equilibrium wavelength $\lambda_I$ is reflected. At a distance of 6L from the upstream end 312, about 99.8% of the incident light 310 at the equilibrium wavelength $\lambda_I$ is reflected.

In preferred embodiments, the optical fibre 302 is longer than the attenuation length L of the fibre Bragg grating 306. In an embodiment, the optical fibre 302 is at least twice the attenuation length L of the fibre Bragg grating 306. In an embodiment, the optical fibre 302 is at least 6 times the attenuation length L of the fibre Bragg grating 306. In an embodiment, the optical fibre 302 is at least 1,000 times the attenuation length L of the fibre Bragg grating 306. In an embodiment, the optical fibre 302 is at least 10,000 times the attenuation length L of the fibre Bragg grating 306. In an embodiment, the optical fibre 302 is at least 100,000 times the attenuation length L of the fibre Bragg grating 306.

Reflectivity

The attenuation length L is inversely proportional to the reflectivity of the FBG 306. Higher reflectivity per unit length of the FBG 306 results in a shorter attenuation length L. Higher reflectivity advantageously improves the resolution that can be detected by an interrogator. However, known continuous FBG sensors (refer FIG. 3) require low overall reflectivity to enable the TDM interrogator to detect a signal along the length of the optical fibre. Known continuous FBG sensors typically have an overall reflectivity of less than 20% along the entire length of the fibre.

Preferably, the overall reflectivity of the fibre Bragg grating 306 is greater than 20% along the entire length of the optical fibre 302. In an embodiment, the overall reflectivity of the fibre Bragg grating 306 is greater than 50%. In an embodiment, the overall reflectivity of the fibre Bragg grating 306 is greater than 95%. In an embodiment, the overall reflectivity of the fibre Bragg grating 306 is greater than 99%. In an embodiment, the overall reflectivity of the fibre Bragg grating 306 approaches 100%.

Method

A method of sensing a change in temperature and/or strain comprises providing an optical fibre 302 comprising a substantially continuous fibre Bragg grating 306, the fibre Bragg grating 306 having a grating spacing that is substantially the same along the length of the optical fibre 302 when the optical fibre 302 is in an equilibrium temperature and strain condition; providing incident light to an end of the optical fibre 302; detecting a reflected spectrum 314 of the incident light from the optical fibre 302 with a wavelength spectrum interrogator 313; and analysing the reflected spectrum 314 to determine whether or when a portion of the fibre Bragg grating 306 is experiencing a change in temperature and/or strain.

An upstream portion 318 of the optical fibre 302 has an attenuation length L that is adapted to reflect incident light to the interrogator 313 at a first equilibrium wavelength $\lambda_I$, and a downstream portion 320 of the optical fibre 302 is adapted to reflect light to the interrogator 313 when a change in temperature and/or strain at the downstream portion 320 causes a portion of the fibre Bragg grating 306 to reflect light to the interrogator 313 at a second wavelength $\lambda_{II}$ other than the equilibrium wavelength $\lambda_I$ and at a second intensity, wherein in the equilibrium temperature and strain condition, the downstream portion 320 is adapted to reflect no light at the second wavelength $\lambda_{II}$, or is adapted to reflect a first intensity of light at the second wavelength $\lambda_{II}$ that is lower than the second intensity.

The method comprises analysing the detected reflected spectrum 314 using the processor 315 to determine when a portion of the fibre Bragg grating 306 is experiencing a change in temperature and/or strain based on deviation in the detected reflected spectrum from an initial peak $316_I$ corresponding to the equilibrium wavelength $\lambda_I$.

In an embodiment, the wavelength spectrum interrogator 313 is a wavelength division multiplexing (WDM) interrogator.

In an embodiment, the method is used to detect emergence of a hot-spot. In an embodiment, the method is used to detect quench in a high-temperature superconducting field winding.

Schematic Illustration of Reflected Spectrum

FIGS. 5A-D show a schematic representation of how the reflected spectrum 314 changes when a section 322 of the FBG 306 experiences a change in temperature and/or strain. These figures also show an example of how a width of the reflected spectrum at a threshold intensity (50% in this case) can be analysed to determine whether or when a portion of the fibre Bragg grating 306 is experiencing a change in temperature and/or strain.

Figure 5A:
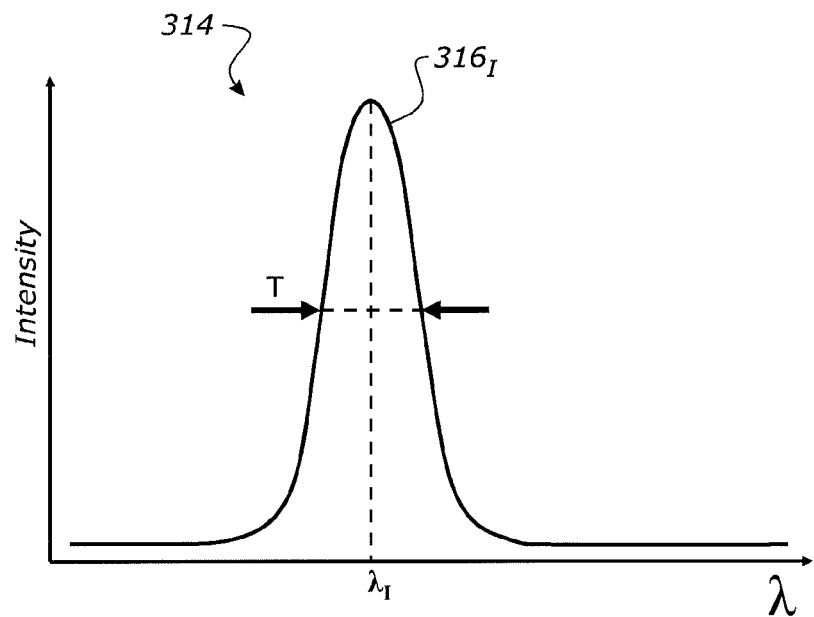
FIGS. 5A-D show a schematic representation of how the reflected spectrum changes when a section of the FBG of FIG. 4A experiences a change in temperature and/or strain.

FIG. 5A shows the reflected spectrum 314 when the optical fibre 302 is in an equilibrium condition. The spectrum 314 has a single peak $316_I$ with a centre wavelength at the equilibrium wavelength $\lambda_I$. At 50% of the maximum intensity of the peak $316_I$, the peak $316_I$ has a width T.

Figure 5B:
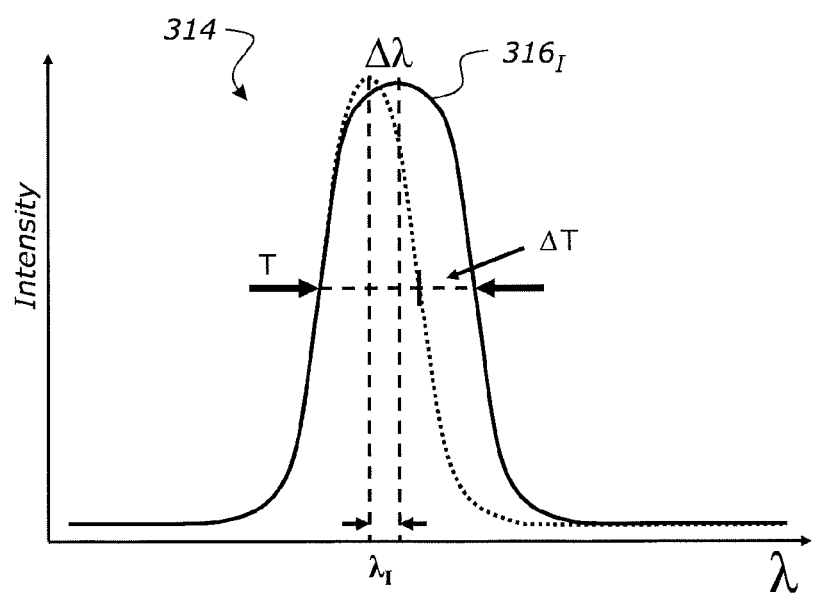

FIG. 5B shows the reflected spectrum 314 as a hot spot starts to develop at or near a section 322 of the FBG 306. The peak $316_I$ starts to broaden and the centre wavelength moves to the right by $\Delta\lambda$. The width W at 50% of the maximum intensity increases by $\Delta T$.

Figure 5C:
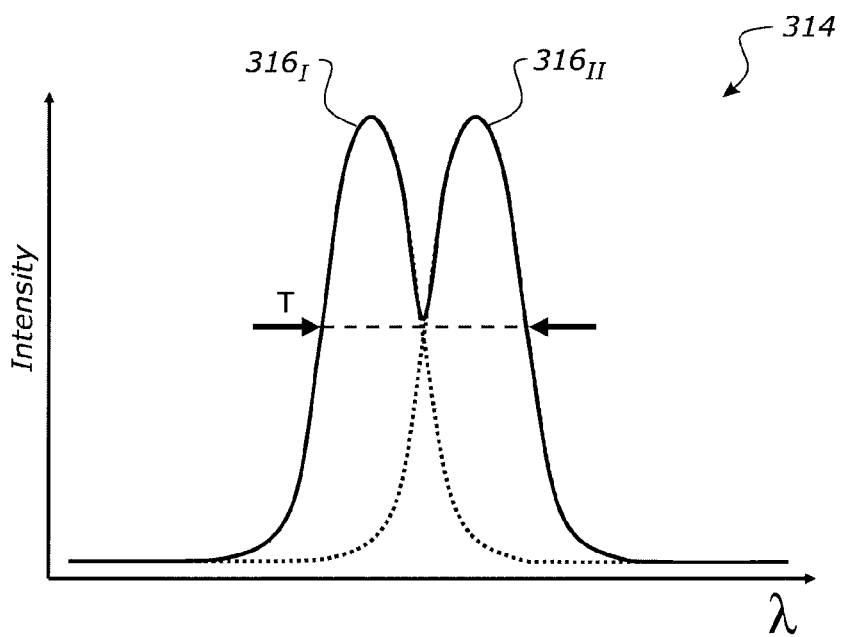

FIG. 5C shows the reflected spectrum 314 as the hot spot continues to develop. The peak 316 begins to split into two distinct peaks $316_I$, $316_{II}$. The width T at 50% of the maximum intensity continues to increase.

Figure 5D:
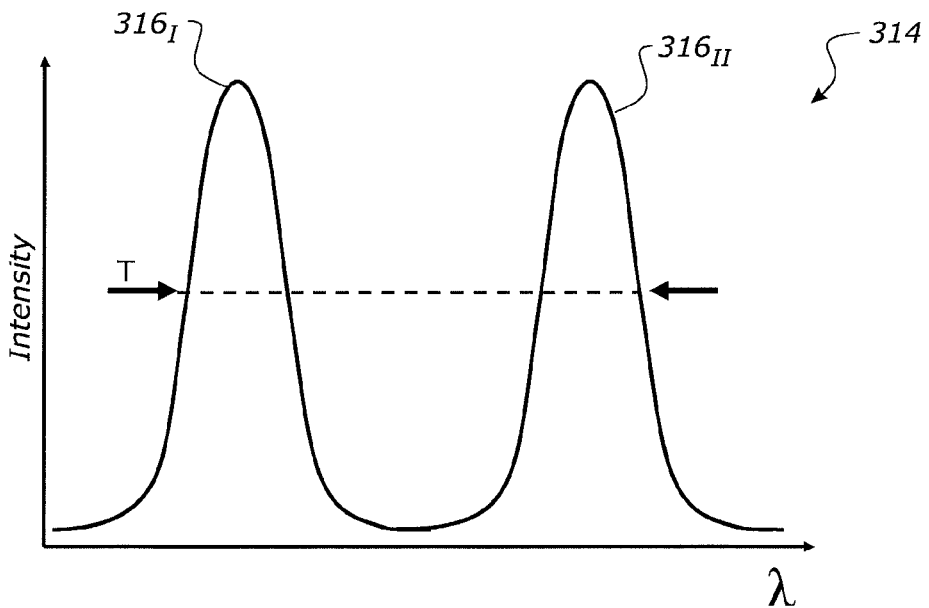

FIG. 5D shows the reflected spectrum 314 once the hot spot is well-established. The peaks $316_I$, $316_{II}$ have fully separated. The width T at 50% of the maximum intensity, determined from the outer edges of the peaks $316_I$, $316_{II}$, is now significantly wider than it was in the equilibrium condition.

FIG. 5A-D represent an ideal scenario. In reality, the peaks $316_I$, $316_{II}$ comprise many smaller peaks and valleys, and are not as distinct from each other as these figures suggest. The real-world scenario will be discussed in more detail below.

Experimental FBG

The following experimental results utilised an optical fibre 302 comprising a chain of identical short FBGs manufactured using Draw Tower Grating (DTG®) inscription technology. The short FBGs were positioned with a very small distance between each individual grating to form a quasi-continuous FBG 306. Each short FBG was 9 mm long. The distance between each short FBG was 1 mm. Each short FBG had a nominal Bragg wavelength of 1550 nm (at zero strain and room temperature). The reflectivity of the short FBGs was around 25% for a 9 mm grating. Preferably the reflectivity of the short FBGs is higher than 15%. Higher reflectivity gratings advantageously enable shorter length hotspots to be detected.

The reflected spectrum was analysed using an Anritsu MS9740A, which enabled wavelength detection across the range 600 to 1750 nm. The spectral span was set to 2 nm for the experiments enabling sampling intervals of around 100 ms.

A hot spot was applied to a section of the continuous FBG 306 using a heater.

Analysis of Reflected Spectrum

Figure 6:
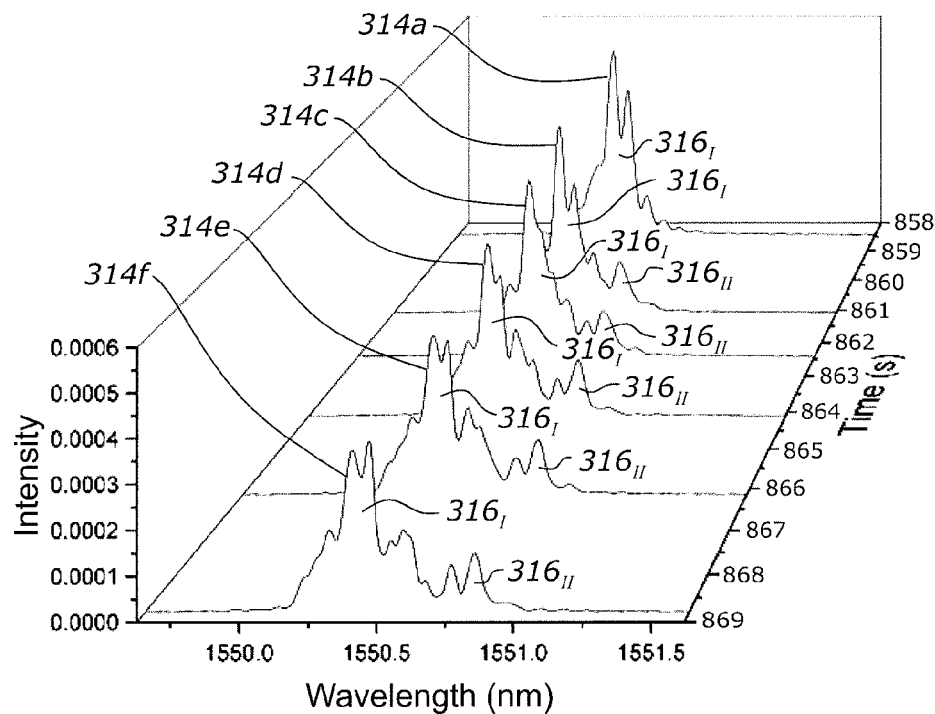
FIG. 6 shows a series of reflected spectrums reflected by the FBG of FIG. 4A as a hot spot is applied to a section of the FBG.

FIG. 6 shows a series of reflected spectrums 314a-314f reflected by the FBG 306 as a hot spot is applied to a section 322 of the FBG 306. Initially, in the equilibrium condition, the spectrum 314a has a single peak $316_I$. When the FBG 306 is subject to a hotspot, the spectrum 314b-314f develops a second peak $316_{II}$. It can be seen that the second peak $316_{II}$ has started developing and has been detected within about 2.5 seconds. The second peak $316_{II}$ continues to gain intensity and move away from the first peak $316_I$ as the hotspot develops.

Figure 7:
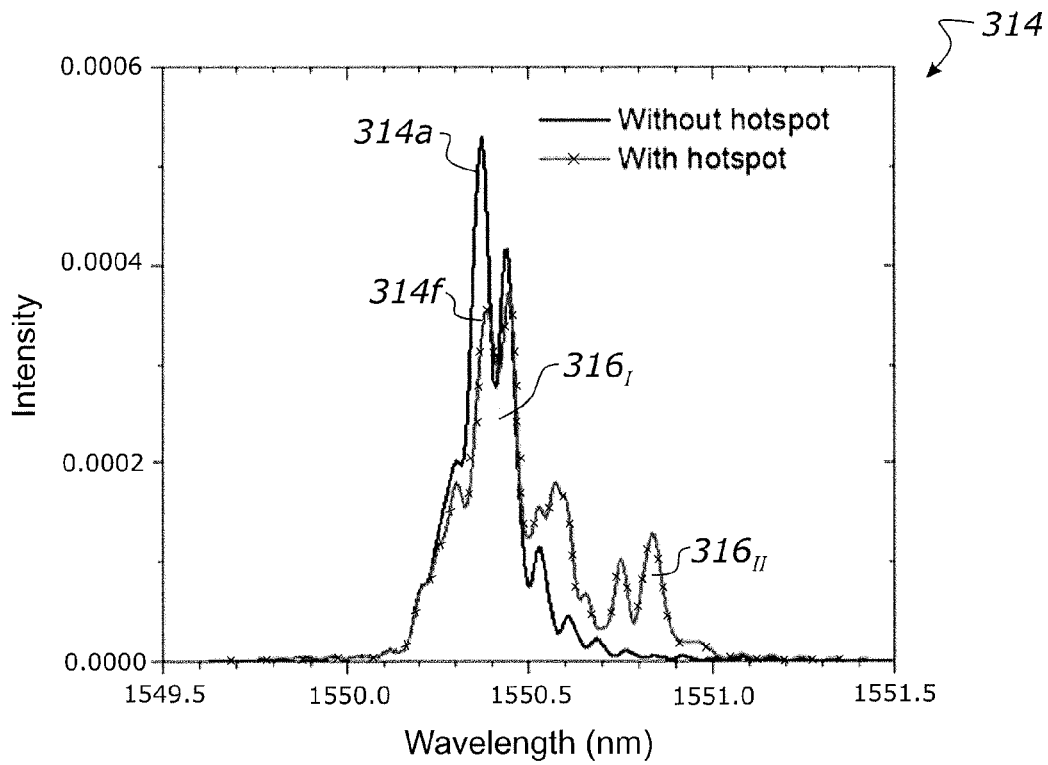
FIG. 7 shows the initial equilibrium reflected spectrum and the final reflected spectrum of FIG. 6 overlaid with each other.

FIG. 7 shows the initial equilibrium reflected spectrum 314a and the final reflected spectrum 314f when the FBG 306 is subject to a hotspot overlaid with each other. The spectrum 314f subject to a hotspot clearly has a second peak $316_{II}$ that is not present in the equilibrium reflected spectrum 314a.

There are several ways in which the processor 315 can be configured to determine whether or when a portion of the fibre Bragg grating 306 is experiencing a change in temperature and/or strain based on a change in dimension of the reflected spectrum 314. Several possible algorithms are discussed below.

Explanation of Terminology

An FBG interrogator 313 detects a spectrum 316. The spectral data consists of a series of sampling points at discrete wavelengths. An intensity level is recorded for each sampling point. A common wavelength interval between two individual sampling points would be 0.010 nm, but this depends on the interrogator used.

The number of sampling points is:
The wavelength at the beginning of the spectrum 316 is the start wavelength. The wavelength at the end of the spectrum 316 is the stop wavelength. The wavelength range of the spectrum 316 is the span.

span=stop wavelength−start wavelength

The distance between two sampling points is the wavelength resolution.

$$\text{wavelength resolution} = \frac{\text{span}}{n-1}$$

The time between recording and analysing two individual spectra is the sampling time. The sampling rate is the inverse of the sampling time.

$$\text{sampling rate} = \frac{1}{\text{sampling time}}$$

For example, a sampling time of 100 ms leads to a sampling rate of 10 Hz.

The intensities at the individual sampling points are referred to as:
$i_1$ to $i_n$ The wavelengths at the individual sampling points are referred to as:
$\lambda_1$ to $\lambda_n$ The array of intensities at the individual sampling points is I:

$$I = \begin{bmatrix} \text{Start wavelength} & i_1 \\ \vdots & \vdots \\ \text{Stop wavelength} & i_n \end{bmatrix}$$

We introduce a 1-D array W of size n as a linear weight:

$$W = \begin{bmatrix} 1 \\ \vdots \\ n \end{bmatrix}$$

Width-at-Threshold Algorithm

In an embodiment, the processor 315 is configured to determine whether or when a portion of the fibre Bragg grating 306 is experiencing a change in temperature and/or strain based on a width-at-threshold algorithm.

This algorithm is similar to a full width half maximum algorithm. However, it is not limited to the 'half maximum' threshold and can be applied for spectral shapes that do not necessarily resemble a single peak. The distance between the first peak $316_I$ and the second peak $316_{II}$ is proportional to the change in temperature that caused the second peak $316_{II}$ to appear. This means that the width-at threshold algorithm can be used to give a quantitative value for the temperature difference between the coldest and hottest spot.

Figure 8A:
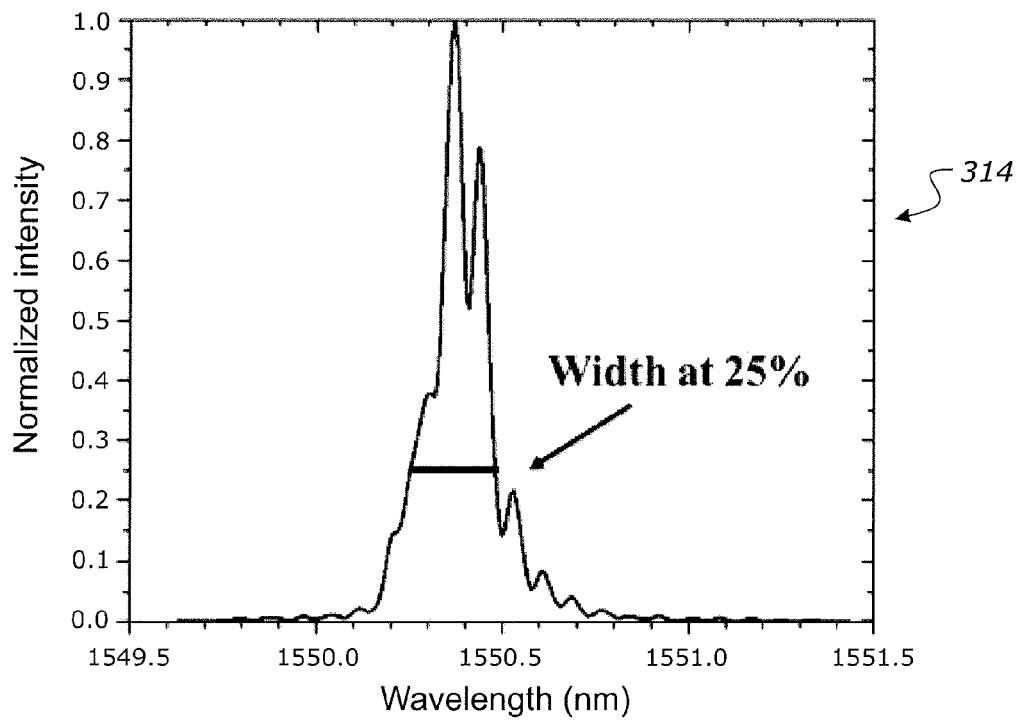
FIG. 8A shows a width-at-threshold algorithm applied to the reflected spectrum when the FBG of FIG. 4A is in an equilibrium condition (no hotspot)
Figure 8B:
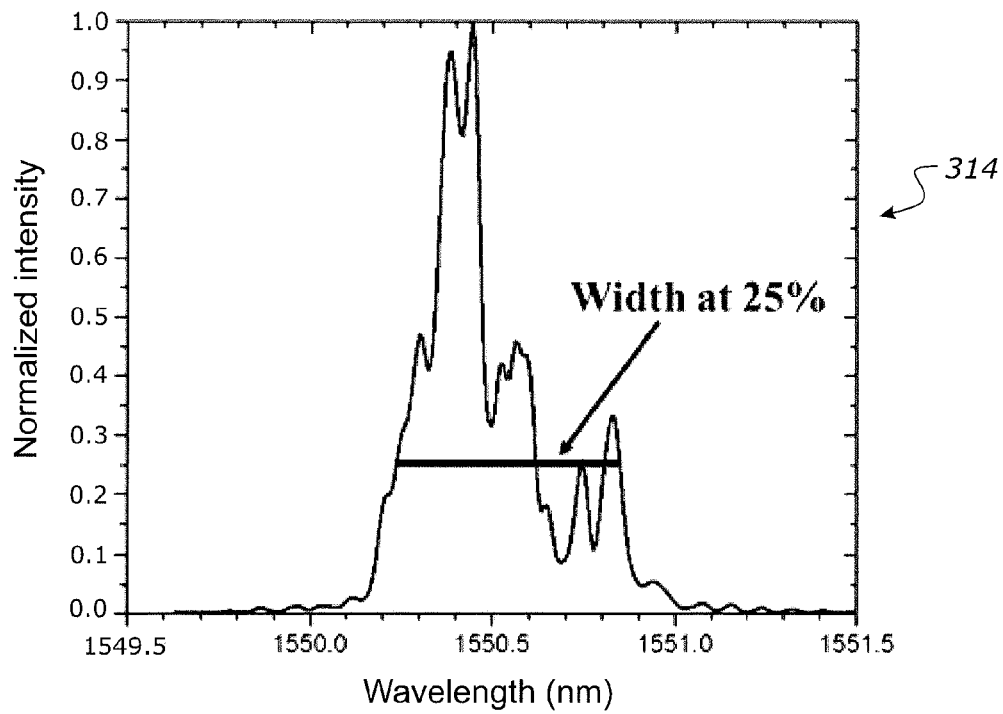
FIG. 8B shows the width-at-threshold algorithm of FIG. 8A when the FBG is subject to a hotspot.

FIG. 8A shows the width-at-threshold algorithm applied to the reflected spectrum 314 when the FBG 306 is in an equilibrium condition. FIG. 8B shows the width-at-threshold algorithm applied to the reflected spectrum 314 when the FBG 306 is subject to a hotspot.

The algorithm is applied as follows:
1. Decide a threshold level. For example, the threshold is set to 25% of the maximum peak amplitude.

$c_{thresh}=0.25$

In general: $0 < c_{thresh} < 1$
2. Normalize the maximum peak amplitude of the spectrum.

$$I_{norm} = \frac{I - I_{min}}{I_{max} - I_{min}}$$

For simplicity, we now refer to the normalised intensities at the individual sampling points as $i_1$ to $i_n$.
3. Start from the left side of the spectrum (the start wavelength) and move to the right (in the direction of increasing wavelength) to determine the wavelength at which the intensity first reaches a value above the set threshold (in this case an amplitude of 0.25).
4. Determine the exact wavelength (location) at which the threshold is reached by linear interpolation between data points on either side of the threshold.
Expressed in code form:

$I = I_{norm}$

For $i = 1 \ldots n$

If $i_n \geq c_{thresh}$ $\lambda_{thresh\_left} = \lambda_{n-1} + (\lambda_n - \lambda_{n-1}) \frac{i_{thresh} - i_{n-1}}{i_n - i_{n-1}}$ Else if $n = n + 1$ Next
5. Start from the right of the spectrum (the stop wavelength) and move to the left (in the direction of decreasing wavelength) to look determine the wavelength at which the intensity first reaches a value above the set threshold.
6. Determine the exact wavelength (location) at which the threshold is reached by linear interpolation between data points on either side of the threshold.
Expressed in code form:

$$I = I^{-1}$$

For $i = 1 \ldots n$

If $i_n \geq c_{thresh}$ $$\lambda_{thresh\_right} = \lambda_{n-1} + (\lambda_n - \lambda_{n-1})\frac{i_{thresh} - i_{n-1}}{i_n - i_{n-1}}$$

Else if $n = n + 1$

Next

7. The distance between the two wavelengths at which the threshold is reached gives the value of the 'width at threshold'. This value can be used to detect an evolving hot spot.

$$T = \lambda_{thresh\_right} - \lambda_{thresh\_left}$$

The threshold level determines the geometry/length of the hotspot that is visible. The threshold should be chosen to ensure that the minimum hotspot length is detected:

$c_{thresh}$ < hotspot length × reflectivity per unit length

The threshold level should also be chosen to be significantly above background noise levels. Depending on the configuration of the system, a threshold between 10% and 50% may be suitable.

Power Integral Algorithm

In an embodiment, the processor 315 is configured to determine whether or when a portion of the fibre Bragg grating 306 is experiencing a change in temperature and/or strain based on a power integral algorithm.

Figure 9A:
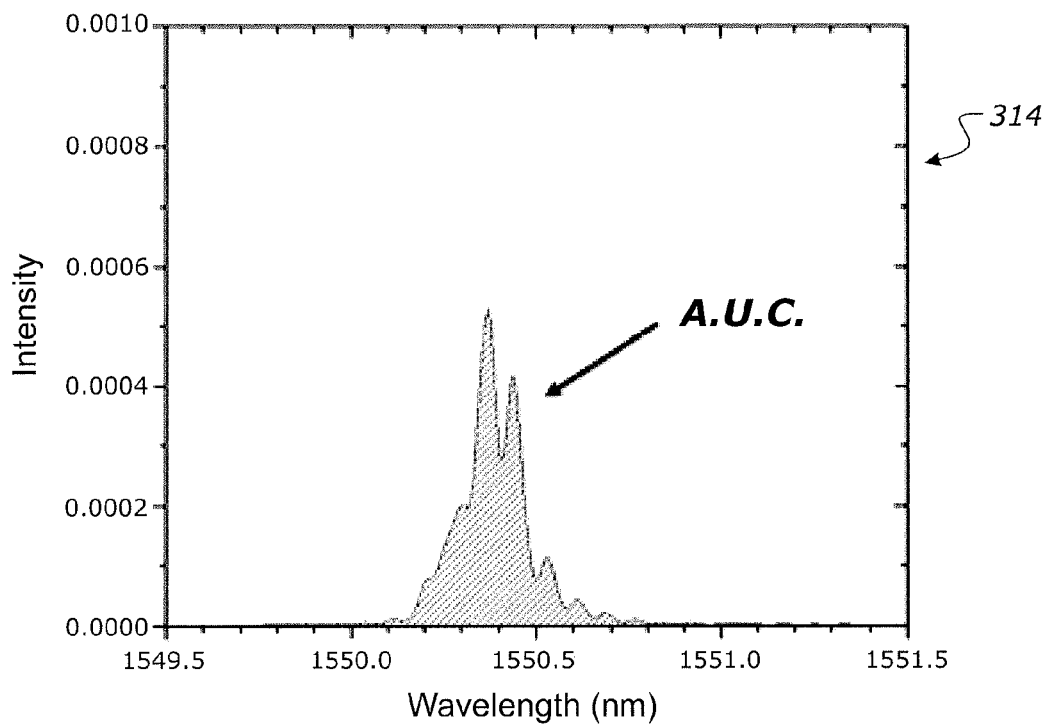
FIG. 9A shows the area determined by the power integral algorithm when the FBG of FIG. 4A is in an equilibrium condition (no hotspot)
Figure 9B:
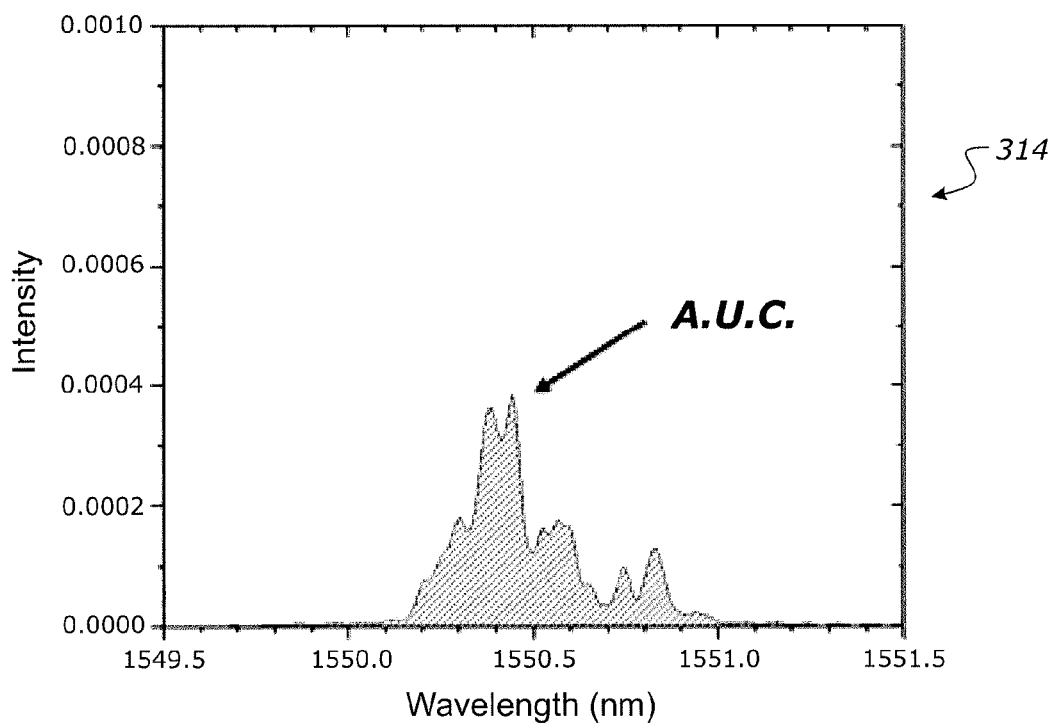
FIG. 9B shows the area determined by the power integral algorithm of FIG. 9A when the FBG is subject to a hotspot.

FIG. 9A shows the area (area under the curve A.U.C.) determined by the power integral algorithm for the reflected spectrum 314 when the FBG 306 is in an equilibrium condition. FIG. 9B shows the area (area under the curve A.U.C.) determined by the power integral algorithm for the reflected spectrum 314 when the FBG 306 is subject to a hotspot.

An integral is the area under a curve. An increase in the area under the curve (spectrum) Indicates a hotspot.

The power integral algorithm is expressed mathematically as:

$$P = \int_{Start\ wavelength}^{Stop\ wavelength} I d\lambda$$

Because $d\lambda$ is constant for all data points in the intensity array I, a simplified approach is to add up the individual intensities at each sampling point:

$$\text{Summed power arrary} = \sum_{z=1}^{n} i_z$$

Unlike the width-at-threshold algorithm, it is not necessary to normalise I for the power integral algorithm.

Change Algorithm

In an embodiment, the processor 315 is configured to determine whether or when a portion of the fibre Bragg grating 306 is experiencing a change in temperature and/or strain based on a change algorithm.

The change algorithm compares the intensities at individual sampling points of a current measurement to the intensities of the same sampling points of a previous measurement, or an average of previous measurements.

The intensity of the current measurement is: $I_t$

The intensity of a previous measurement is: $I_{t-1}$ $I_{t-1}$ may be only the previous intensity measurement. Alternatively, $I_{t-1}$ may be any other individual intensity measurement, such as an initial intensity measurement. Alternatively, $I_{t-1}$ may be an average of several (k) intensity measurements. For example, $I_{t-1}$ may be an average over k=300 measurements (30 seconds for a 100 ms sampling rate).

The change algorithm looks at the difference in the shape of the reflected spectrum 314 at two different times. Referring to FIG. 7, the reflected spectrum 314 changes in intensity between the initial equilibrium reflected spectrum 314a and the final reflected spectrum 314f when the FBG 306 is subject to a hotspot.

Figure 10A:
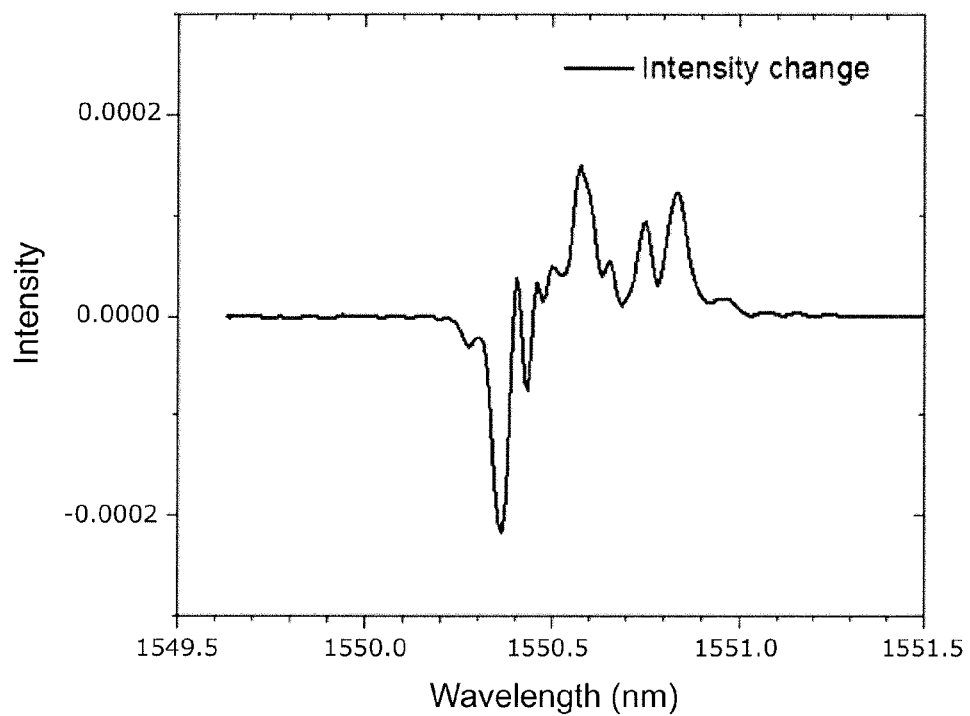
FIG. 10A shows the final spectrum of FIG. 7 subtracted from the initial spectrum of FIG. 7.

FIG. 10A shows the final spectrum 314f (time t) subtracted from the initial spectrum 314a (time t−1).

Figure 10B:
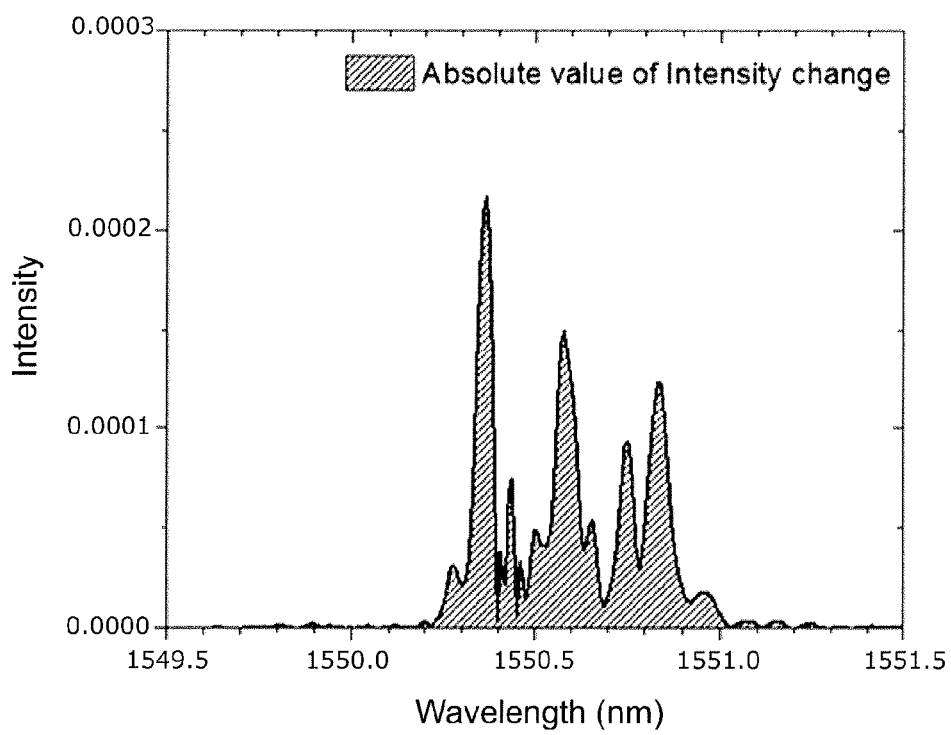
FIG. 10B shows the absolute value of FIG. 10A, the area of which is determined by the change algorithm.

FIG. 10B shows the absolute value of FIG. 10A. The change algorithm considers all changes, positive and negative. The overall change can be calculated by the integral (area under the curve) of FIG. 10B.

The change algorithm is expressed mathematically as:

$$C_k = \int_{Start\ wavelength}^{Stop\ wavelength} |I_t - I_{t-1}| d\lambda$$

Because $d\lambda$ is constant for all data points in the intensity array I, a simplified approach is to add up the individual intensities at each sampling point:

$$\text{Change value} = \sum_{z=1}^{n} |i_{z,t} - i_{z,t-1}|$$

The change algorithm can be also performed on an intensity spectrum that has been previously transformed into frequency-space using a fast Fourier transformation (FFT). Frequency-space analysis may be particularly useful in certain applications because it is not sensitive to uniform temperature changes. FFT can be used to create a 'fingerprint' that can be used to probe for changes. For example, if a long grating is at a uniform temperature, the frequency components will be relatively limited to a single peak. If the temperature of the whole sensor is raised uniformly, no change is seen in the FFT. If the sensor is subject to a hotspot, a second doubled frequency will appear in the FFT.

Unlike the width-at-threshold algorithm, it is not necessary to normalise I for the power integral algorithm.

Weight

In an embodiment, the processor 315 is configured to determine whether or when a portion of the fibre Bragg grating 306 is experiencing a change in temperature and/or strain based on applying a weight to the spectrum prior to using the algorithm.

A weight may be applied to any of the algorithms discussed above. The weight is generally in a form that applies a heavier weighting to spectral movements to a higher wavelength (as would be expected when a hot spot occurs) than spectral movements to a lower wavelength.

Weighted Power Integral

By way of example, a weight applied to the power integral algorithm is discussed below.

For the weighted power integral, the intensity is multiplied with a weight before calculating the integral.

$$P_W = \int_{Start\ wavelength}^{Stop\ wavelength} I \cdot W d\lambda$$

The weight may be linear:

$$W = \begin{bmatrix} 1 \\ \vdots \\ n \end{bmatrix}$$

Alternatively, the weight may be quadratic:

$$W^2 = W \cdot W$$

Alternatively, the weight may be any other form where:

$$w_z < w_{z+1}$$

For the weighted power integral it is important to select the section of the spectrum in such a way that noise in the far end of the spectrum does not overpower the signal. In an embodiment, the spectrum is selected to be ±1-2 nm of the main FBG peak $316_f$.

As above, the weighted power integral may be simplified to:

$$\text{Summed weighted power array} = \sum_{z=1}^{n} i_z \times w_z$$

Experimental Test Setup

Figure 11:
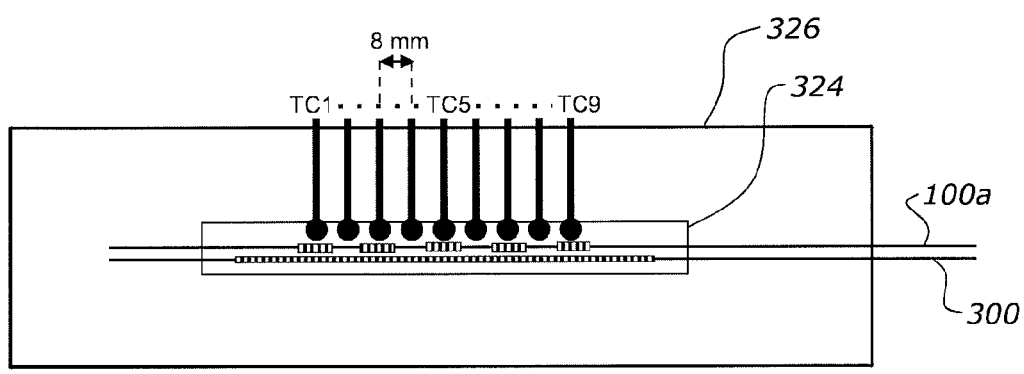
FIG. 11 shows a schematic of an experimental test setup.

FIG. 11 shows a schematic of an experimental test setup. High temperature superconducting (HTS) tape 324 was clamped to a base plate 326. A heater 328 was placed in intimate touching contact with the HTS tape 324. Nine spaced apart thermocouples TC1 to TC9 were attached to the HTS tape 324 to provide independent temperature measurements as a function of position. The nine thermocouples were placed in a line separated by 8 mm between each thermocouple. Thermocouple 5 (TC5) was sitting directly on top of the hotspot/heater.

A quasi-distributed FBG sensor 100a comprising five short gratings (standard technique) was attached to the HTS tape 324. The quasi-distributed sensor 100a had 8 mm gratings with 8 mm spacing between the gratings. The five gratings of the quasi-distributed sensor 100a were positioned so that each grating was adjacent to a respective one of thermocouples TC1, TC3, TC5, TC7, and TC9.

An optical fibre sensing system 300 comprising a continuous FBG 306 formed from a closely spaced chain of short FBGs as described above was placed on top of the HTS tape 324. The optical fibre 302 of the optical fibre sensing system 300 was positioned directly next to the quasi-distributed FBG sensor 100a.

The thermocouples TC1 to TC9, quasi-distributed FBG sensor 100a, and optical fibre 302 were bonded to the HTS tape 324 using a suitable adhesive.

Test Results

The setup was tested at room temperature, 0° C. and various cryogenic temperatures with no significant variation. The setup was then cooled to around 77K (−196° C.).

Figure 12A:
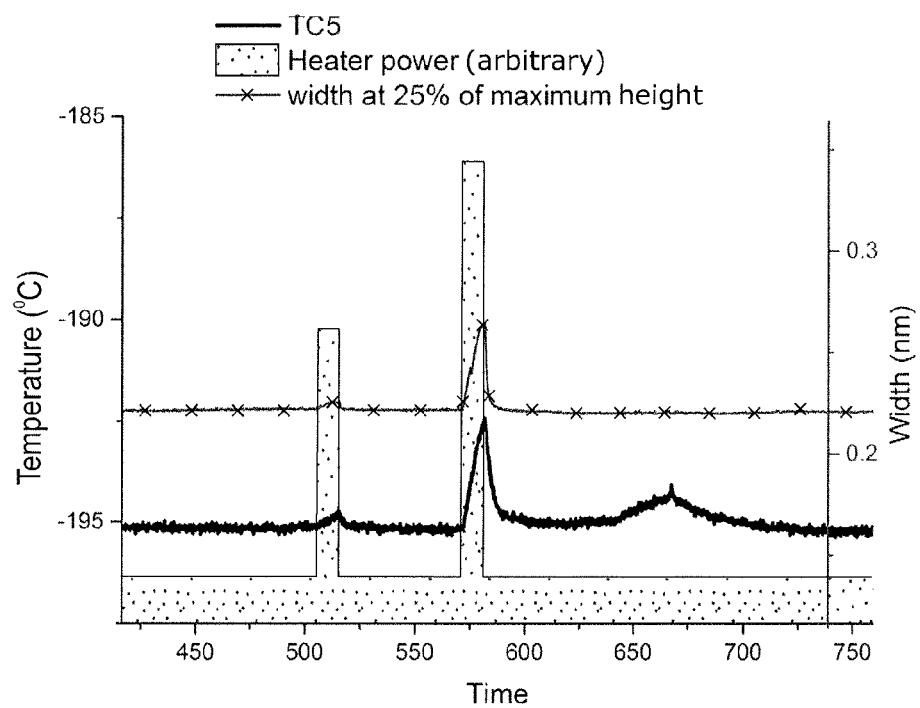
FIGS. 12A-B show the initial results obtained from the experimental test setup of FIG. 11 at around 77K (−196° C.)
Figure 12B:
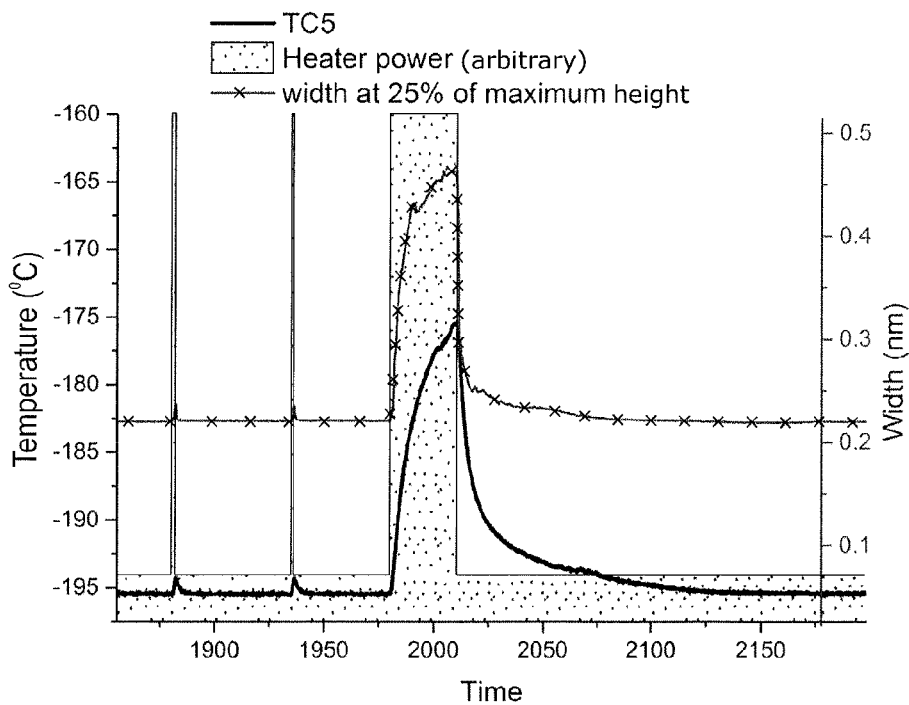

FIG. 12A and FIG. 12B show the initial results obtained at around 77K (−196° C.). FIG. 12A and FIG. 12B show the time at which the heater was turned on (grey), the measured temperature at the centre thermocouple (TC5, darker line) and the response of the optical fibre sensing system 300 (lighter line with x markers). The continuous grating 306 was interrogated using the width-at-threshold algorithm with the threshold set to 25% of the maximum amplitude.

A clear response of the sensor 300 at even small temperature changes is visible. Temperature differences as small as around 1K (1° C.) are readily detectable. That is, the system 300 is capable of determining when a portion of the fibre Bragg grating 306 is experiencing a change in temperature as small as around 1 Kelvin (1° C.).

Comparison with Quasi-Distributed Sensing Technique

Figure 13:
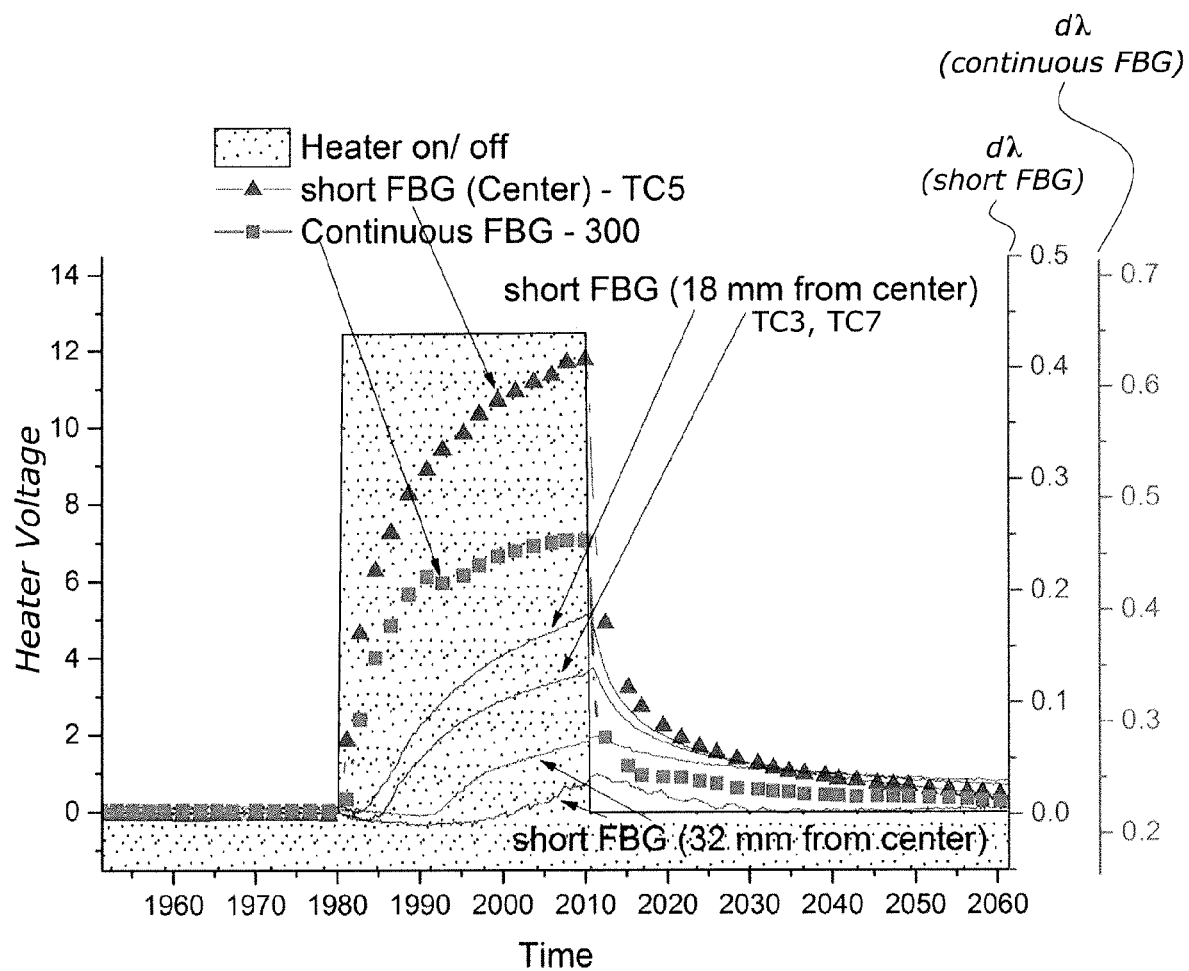
FIG. 13 shows a comparison of the response of the sensors of the experimental test setup of FIG. 11.

FIG. 13 shows a comparison of the response of each of the short FBGs in the quasi-distributed sensor 100a and the response of the optical fibre sensing system 300. The short FBG placed directly on top of the heater (at TC5) responds slightly faster than the continuous FBG 306. However, the FBGs that are not directly located on the heater respond with a significant delay in time and reduction in amplitude, compared to the continuous FBG 306. Unless a single short grating is placed within 8 mm of the hotspot, the continuous FBG 306 will detect the hotspot faster than can be detected using the quasi-distributed sensor 100a.

In practice it is impossible to predict the precise location at which a hotspots will arise in a superconducting coil. It is advantageous to use a sensor having a continuous grating 306 such as the optical fibre sensing system 300, rather than a quasi-distributed FBG sensor 100a. A continuous FBG 306 is able to cover a greater length (or area, if arranged in a coil).

Comparison of Different Algorithms

The choice of algorithm is driven by several factors, including speed of computation, sensitivity to initial changes, and robustness to long-term drift. Different algorithms may be more suitable for certain applications depending on the type of processor used and the particular spectrum reflected by the sensor.

Figure 14A:
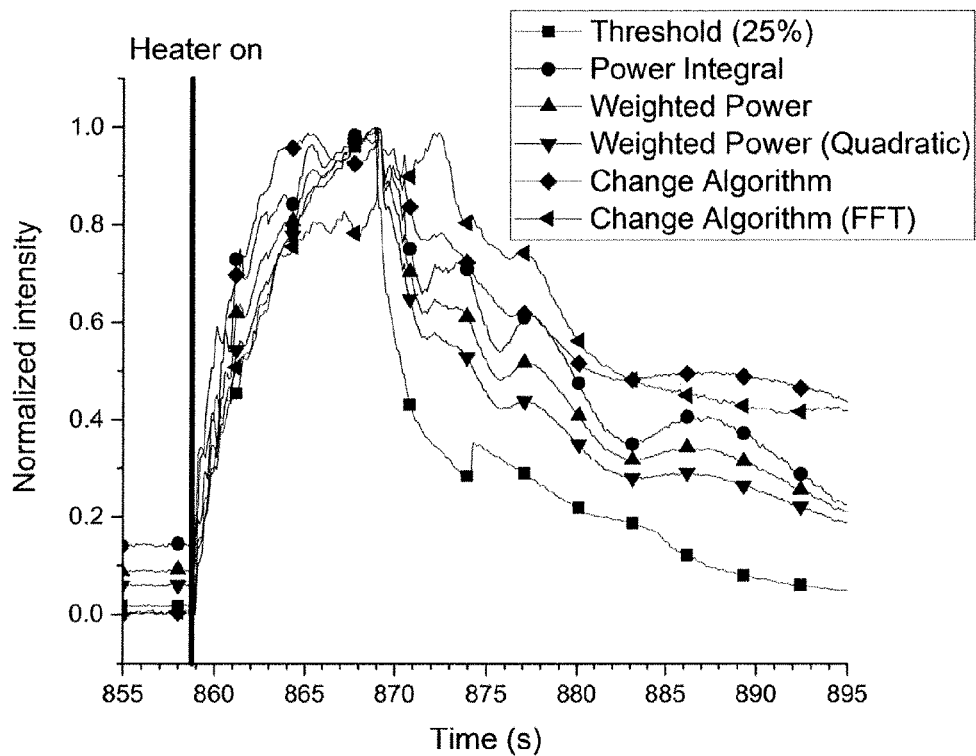
FIGS. 14A-B show a comparison of the normalised response for the width-at-threshold, power integral, change, and weighted power integral algorithms.
Figure 14B:
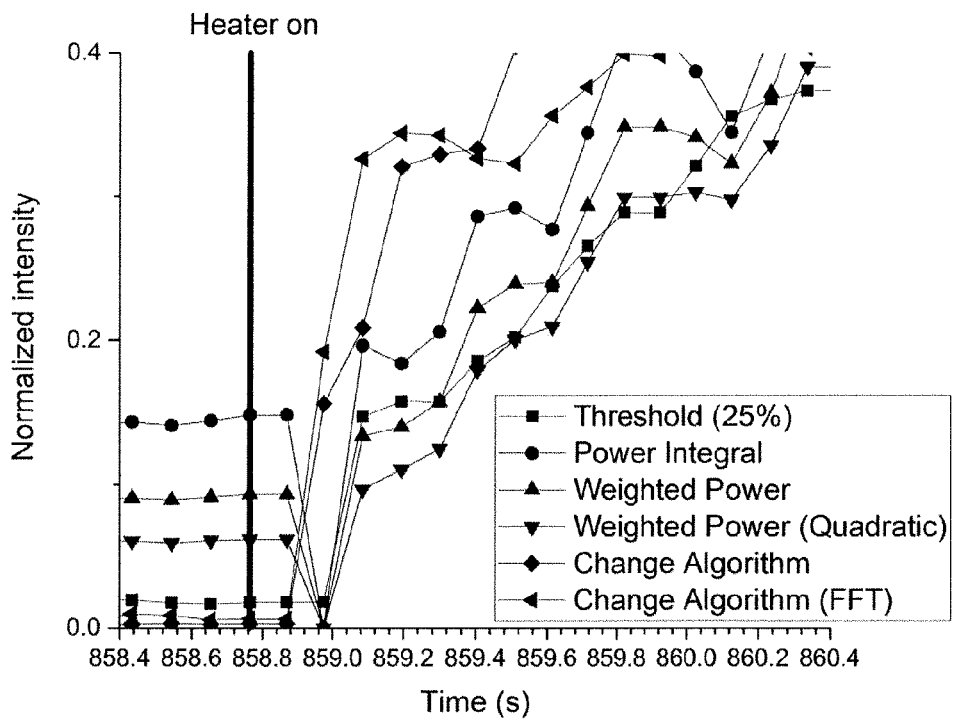

FIG. 14A shows a comparison of the normalised response for the width-at-threshold, power integral, change, and weighted power integral algorithms discussed above. FIG. 14B shows a close up of the initial portion of the response. The power integral, the weighted power integral, and the change algorithm all respond at the same time. The width-at-threshold algorithm is delayed by 0.1 second (sampling time). Both power integrals first indicate the change with a negative response. In some embodiments, this characteristic could be utilised as a trigger.

Figure 15:
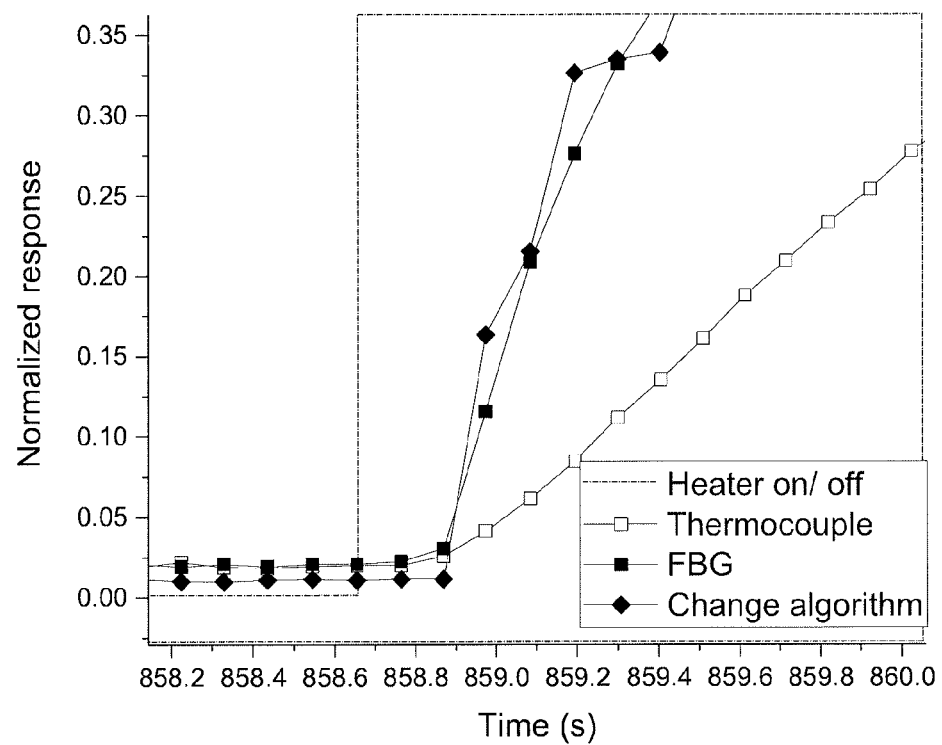
FIG. 15 shows a comparison of the change algorithm to both the response of a conventional FBG and to a thermocouple measurement.

FIG. 15 shows a comparison of the change algorithm to both the response of a conventional FBG (short, 8 mm long) and to a thermocouple measurement. Both were placed directly on top of the hotspot (heater). All measurements were recorded simultaneously. The grey portion indicates when the heater was turned on. FIG. 15 shows that the change algorithm responds as quickly as a conventional short FBG to the presence of a hotspot.

Practical Applications/Advantages

The optical fibre sensing system 300 may be suitable for detecting quench in high temperature superconducting (HTS) applications. Experiments have been undertaken on a straight HTS tape using a 100 mm continuous FBG (10 gratings with 9 mm length). Experiments have also been undertaken on a coiled HTS tape using a 500 mm continuous FBG (50 gratings with 9 mm length). At 77 Kelvin (−196.15° C.) hotspots with a temperature difference as small as 5K (5° C.) have been detected. That is, the system 300 is capable of determining when a portion of the fibre Bragg rating 306 is experiencing a change in temperature as small as 5 Kelvin (5° C.). The optical fibre sensing system 300 may be used for quick and efficient quench mitigation.

Sensitive detection of small temperature changes in HTS applications is important to avoid quench. A system of the type described with reference to FIG. 3 would only detect the temperature change slowly, by which time the positive reinforcement would lead to thermal runaway and the quench may not be recoverable.

A system of the type described in US 2004/0067003 would only detect the temperature change once it is sufficiently high that fully separated discrete wavelength peaks have been formed. Again, by which time the positive reinforcement would lead to thermal runaway and the quench may not be recoverable.

The continuous FBG 306 is able to be interrogated whilst subject to background inhomogeneous thermal strain (for example, due to bending around a curved path, or inhomogeneous material properties). This strain gives rise to peak splitting in the reflected spectrum 314. These multiple, 'messy', peaks cannot be readily interrogated by conventional interrogation systems designed to probe the symmetric response from a 'single peak' FBG sensor.

The algorithms of the present disclosure observe deviation in the detected reflected spectrum 314 from the initial peak corresponding to the equilibrium wavelength, which enables the formation of localised hot spots along the optical fibre 302 to be detected. This is possible because signal from the extended length of optical fibre 302 is only detected when the wavelength shifts at least slightly outside of the 'masking peak' formed by high-intensity reflection which occurs in the very short front section of the fibre.

It is not necessary for the reflected spectrum to have fully separated discrete wavelength peaks for the optical fibre sensing system 300 to detect the temperature and/or strain change in the fibre 302. The processor 315 is able to analyse the reflected spectrum to determine when a portion of the fibre Bragg grating 306 is experiencing a change in temperature and/or strain by detecting a change in an envelope of the reflected spectrum with non-separated peaks. This means that the optical fibre sensing system 300 can detect when the fibre Bragg grating 306 is experiencing an initial temperature and/or strain change, enabling quick detection and high sensitivity to small temperature and/or strain changes.

The optical fibre 302 of the optical fibre sensing system 300 can be very long, up to several hundred metres or several kilometres long, enabling it to be spread across an entire item of interest (for example an HTS coil). Unlike known long FBG sensors, the optical fibre sensing system 300 can maintain very high temperature sensitivity and can be interrogated using a standard WDM interrogator 313.

In addition to quench detection in HTS applications, the optical fibre sensing system 300 may be useful for other applications where hotspot detection is important, such as other cryogenic systems, or room temperature coils such as transformers and motor windings.

Some other possible applications for the optical fibre sensing system 300 include:

Aerospace and Aircraft: Testing structural integrity of wings and fuselage components, and performance of engines (fuels tanks, load on landing gear, and icing on wings). Quench detection in electric motors/generators. Testing heat shields for space craft, leakage sensors for liquid oxygen (and other fuels) tanks on space craft (or anywhere else).

Energy: Stress detection in wind turbine blades.

Medical: Fibre optic sensors are ideal for many medical applications, especially radiology devices where integration, quality, reliability of the data is produced. MRI compatible tools and devices surrounding eye surgery. Quench detection in High Temperature superconducting coils for NMR magnets.

Preferred embodiments of the invention have been described by way of example only and modifications may be made thereto without departing from the scope of the invention.

The invention claimed is:

1. An optical fibre sensing system comprising:
an optical fibre comprising a substantially continuous fibre Bragg grating, the fibre Bragg grating having a grating spacing that is substantially the same along the length of the optical fibre when the optical fibre is in an equilibrium temperature and strain condition;
an incident light source for providing incident light to an upstream end of the optical fibre; and
a wavelength spectrum interrogator for detecting a reflected spectrum of the incident light from the optical fibre;
wherein an upstream portion of the optical fibre has an attenuation length that is adapted to reflect incident light to the interrogator at a first equilibrium wavelength, and a downstream portion of the optical fibre is adapted to reflect light to the interrogator when a change in temperature and/or strain at the downstream portion causes a portion of the fibre Bragg grating to reflect light to the interrogator at a second wavelength other than the equilibrium wavelength and at a second intensity, wherein in the equilibrium temperature and strain condition, the downstream portion is adapted to reflect no light at the second wavelength, or is adapted to reflect a first intensity of light at the second wavelength that is lower than the second intensity;
the optical fibre sensing system further comprising a processor configured to analyse the detected reflected spectrum to determine when a portion of the fibre Bragg grating is experiencing a change in temperature and/or strain based on deviation in the detected reflected spectrum from an initial peak corresponding to the equilibrium wavelength, wherein the detected reflected spectrum comprises the initial peak and another peak overlapping one another, the other peak corresponding to the second wavelength, wherein the processor is configured to determine when a portion of the fibre Bragg grating is experiencing a change in temperature and/or strain based on a width-at-threshold algorithm and applying a weight to the reflected spectrum prior to using the algorithm.

2. The optical fibre sensing system of claim 1, wherein the optical fibre is at least 100 mm long.

3. The optical fibre sensing system of claim 1, wherein the fibre Bragg grating extends along substantially the entire length of the optical fibre.

4. The optical fibre sensing system of claim 1, wherein the optical fibre comprises a plurality of short fibre Bragg gratings in series to form a substantially continuous fibre Bragg grating.

5. The optical fibre sensing system of claim 4, wherein the short fibre Bragg gratings are about 9 mm long.

6. The optical fibre sensing system of claim 4, wherein the short fibre Bragg gratings are spaced apart by about 1 mm.

7. The optical fibre sensing system of claim 1, wherein the optical fibre comprises a single, continuous fibre Bragg grating.

8. The optical fibre sensing system of claim 1, wherein the optical fibre is longer than the attenuation length of the fibre Bragg grating.

9. The optical fibre sensing system of claim 8, wherein the optical fibre is at least twice the attenuation length of the fibre Bragg grating, and optionally wherein the optical fibre is at least 6 times the attenuation length of the fibre Bragg grating.

10. The optical fibre sensing system of claim 1, wherein the overall reflectivity of the fibre Bragg grating is greater than 20%, optionally wherein the overall reflectivity of the fibre Bragg grating is greater than 50%, optionally wherein the overall reflectivity of the fibre Bragg grating is greater than 95%, and optionally wherein the overall reflectivity of the fibre Bragg grating is greater than 99%.

11. The optical fibre sensing system of claim 1, wherein the processor is configured to analyse the reflected spectrum to determine when a portion of the fibre Bragg grating is experiencing a change in temperature and/or strain by detecting a change in an envelope of the reflected spectrum with non-separated peaks.

12. The optical fibre sensing system of claim 1, wherein the processor is configured to determine when a portion of the fibre Bragg grating is experiencing a change in temperature and/or strain based on a change in dimension of the reflected spectrum.

13. The optical fibre sensing system of claim 1, wherein the processor is configured to determine when a portion of the fibre Bragg grating is experiencing a change in temperature and/or strain based on a power integral algorithm.

14. The optical fibre sensing system of claim 1, wherein the processor is configured to determine when a portion of the fibre Bragg grating is experiencing a change in temperature and/or strain based on a change algorithm.

15. The optical fibre sensing system of claim 1, wherein the fibre Bragg grating is adapted to reflect light to the interrogator at the second wavelength when a change in temperature and/or strain occurs in the upstream portion of the optical fibre.

16. The optical fibre sensing system of claim 1, that is capable of determining when a portion of the fibre Bragg grating is experiencing a change in temperature as small as 5 Kelvin (5° C.), and optionally that is capable of determining when a portion of the fibre Bragg grating is experiencing a change in temperature as small as 1 Kelvin (1° C.).

17. A method of sensing a change in temperature and/or strain, comprising:
providing an optical fibre comprising a substantially continuous fibre Bragg grating, the fibre Bragg grating having a grating spacing that is substantially the same along the length of the optical fibre when the optical fibre is in an equilibrium temperature and strain condition;
providing incident light to an end of the optical fibre;
detecting a reflected spectrum of the incident light from the optical fibre with a wavelength spectrum interrogator;
wherein an upstream portion of the optical fibre has an attenuation length that is adapted to reflect incident light to the interrogator at a first equilibrium wavelength, and a downstream portion of the optical fibre is adapted to reflect light to the interrogator when a change in temperature and/or strain at the downstream portion causes a portion of the fibre Bragg grating to reflect light to the interrogator at a second wavelength other than the equilibrium wavelength and at a second intensity, wherein in the equilibrium temperature and strain condition, the downstream portion is adapted to reflect no light at the second wavelength, or is adapted to reflect a first intensity of light at the second wavelength that is lower than the second intensity;
wherein the method further comprises analysing the detected reflected spectrum using a processor to determine when a portion of the fibre Bragg grating is experiencing a change in temperature and/or strain based on deviation in the detected reflected spectrum from an initial peak corresponding to the equilibrium wavelength, wherein the detected reflected spectrum comprises the initial peak and another peak overlapping one another, the other peak corresponding to the second wavelength, wherein the processor is configured to determine when a portion of the fibre Bragg grating is experiencing a change in temperature and/or strain based on a width-at-threshold algorithm and applying a weight to the reflected spectrum prior to using the algorithm.

18. The method of claim 17, wherein the method is used to detect emergence of a hot-spot and/or wherein the method is used to detect quench in a high-temperature superconducting field winding; and optionally wherein the fibre Bragg grating is subject to background inhomogeneous thermal strain which causes peak splitting in the detected reflected spectrum.

19. The optical fibre sensing system of claim 1, wherein the optical fibre has a single core, the single core comprising the substantially continuous fibre Bragg grating.

20. The method of claim 17, wherein the optical fibre has a single core, the single core comprising the substantially continuous fibre Bragg grating.

* * * * *